United States Patent
Breuer et al.

(10) Patent No.: US 9,948,391 B2
(45) Date of Patent: Apr. 17, 2018

(54) TECHNIQUES FOR DETERMINING A LIGHT-BASED COMMUNICATION RECEIVER POSITION

(71) Applicants: Christian Breuer, Newburyport, MA (US); Anant Aggarwal, Waltham, MA (US); Barry Stout, Beverly, MA (US)

(72) Inventors: Christian Breuer, Newburyport, MA (US); Anant Aggarwal, Waltham, MA (US); Barry Stout, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 559 days.

(21) Appl. No.: 14/572,081

(22) Filed: Dec. 16, 2014

(65) Prior Publication Data

US 2015/0276399 A1    Oct. 1, 2015

Related U.S. Application Data

(60) Provisional application No. 61/970,305, filed on Mar. 25, 2014, provisional application No. 61/970,307, (Continued)

(51) Int. Cl.
  *H04B 10/116* (2013.01)
  *G01C 3/08* (2006.01)
  (Continued)

(52) U.S. Cl.
  CPC .............. *H04B 10/116* (2013.01); *G01C 3/08* (2013.01); *G01C 21/206* (2013.01); *G01S 1/70* (2013.01);
  (Continued)

(58) Field of Classification Search
  CPC .. H04B 10/11; H04B 10/1143; H04B 10/541; H04N 5/2353; H04N 3/1506; H04N 5/2352; H04N 5/243; H04W 4/001
  See application file for complete search history.

(56) References Cited

U.S. PATENT DOCUMENTS

2004/0233461 A1* 11/2004 Armstrong .......... G01C 11/025
  356/620
2012/0154824 A1   6/2012 Kim et al.
  (Continued)

FOREIGN PATENT DOCUMENTS

WO    2015014444 A1 †  1/2015

OTHER PUBLICATIONS

Wang, Hongbo et al, "Vision-Based Navigation for an Electric Wheelchair Using Ceiling Light Landmark", Journal of Intelligent and Robotic Systems, Theory and Applications, Kluwer Academic Publishers, vol. 41, No. 4, pp. 283-314.
(Continued)

*Primary Examiner* — Luke D Ratcliffe
(74) *Attorney, Agent, or Firm* — Yutian Ling

(57) ABSTRACT

Techniques are disclosed for determining a light-based communication (LCom) receiver position. The techniques can be used to determine the position of a receiver relative to a specific luminaire within the field of view (FOV) of the receiver camera. The relative position may be calculated by determining the distance and the orientation of the receiver relative to the luminaire. The distance relative to the luminaire may be calculated using the observed size of the luminaire in an image generated by the receiver camera, the image zoom factor, and actual geometry of the luminaire. The orientation relative to the luminaire may be determined using a fiducial associated with the luminaire that can be used as an orientation cue. Once the position of a receiver relative to a luminaire is determined, the absolute position of the receiver may be calculated using the absolute position of the luminaire.

17 Claims, 21 Drawing Sheets

Related U.S. Application Data filed on Mar. 25, 2014, provisional application No. 61/970,310, filed on Mar. 25, 2014, provisional application No. 61/970,321, filed on Mar. 25, 2014, provisional application No. 61/970,325, filed on Mar. 25, 2014.

(51) Int. Cl.

| | |
|---|---|
| G06T 7/90 | (2017.01) |
| H04J 3/10 | (2006.01) |
| H04J 14/08 | (2006.01) |
| G06K 9/34 | (2006.01) |
| G06K 9/62 | (2006.01) |
| H04B 10/079 | (2013.01) |
| H04B 10/50 | (2013.01) |
| H04B 10/516 | (2013.01) |
| G01C 21/20 | (2006.01) |
| G01S 1/70 | (2006.01) |
| G01S 5/16 | (2006.01) |
| G01S 11/12 | (2006.01) |
| H04B 10/114 | (2013.01) |
| G06K 9/46 | (2006.01) |
| H04B 10/556 | (2013.01) |
| H04N 5/353 | (2011.01) |

(52) U.S. Cl.
CPC .............. *G01S 5/163* (2013.01); *G01S 11/12* (2013.01); *G06K 9/34* (2013.01); *G06K 9/4661* (2013.01); *G06K 9/6218* (2013.01); *G06T 7/90* (2017.01); *H04B 10/0795* (2013.01); *H04B 10/114* (2013.01); *H04B 10/1149* (2013.01); *H04B 10/501* (2013.01); *H04B 10/502* (2013.01); *H04B 10/516* (2013.01); *H04B 10/5563* (2013.01); *H04J 3/10* (2013.01); *H04J 14/086* (2013.01); *H04N 5/3532* (2013.01); *G06T 2207/10004* (2013.01); *G06T 2207/20021* (2013.01)

(56) References Cited

U.S. PATENT DOCUMENTS

2013/0330088 A1* 12/2013 Oshima .................. H04B 10/11
398/130
2014/0084050 A1† 3/2014 Calvarese

OTHER PUBLICATIONS

Theunissen, Lars, International Search Report and the Written Opinion of the International Searching Authority, for counterpart application PCT/US2015/021151, dated Aug. 4, 2015, European Patent Office, Rijswijk, The Netherlands (13 pages).

\* cited by examiner
† cited by third party

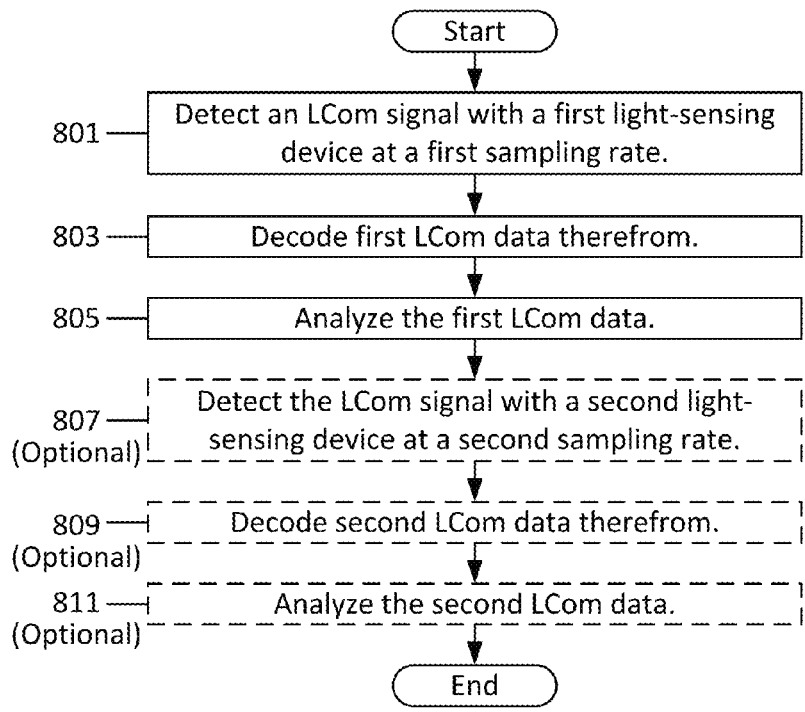
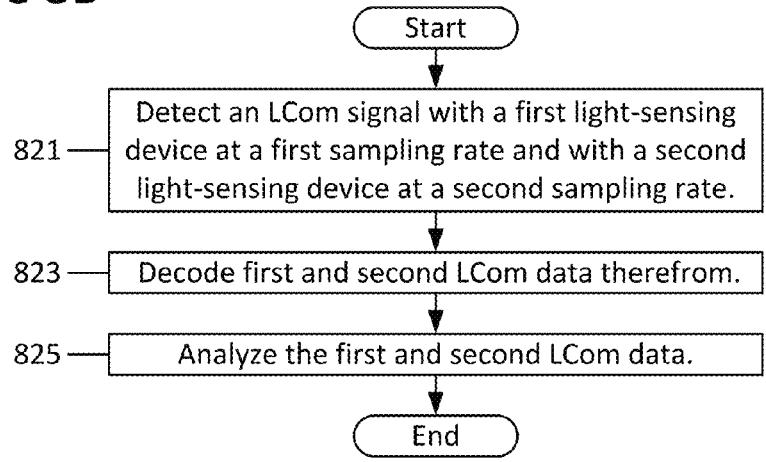

LCom-Enabled
Luminaire $L_1$
(Dominant LCom Signal)

LCom-Enabled
Luminaire $L_2$

Frame 1
at $t_1$

LCom-Enabled
Luminaire $L_1$
(Dominant LCom Signal)

LCom-Enabled
Luminaire $L_2$

Frame 2
at $t_2 > t_1$

Pulsing Light of
LCom Signal

TECHNIQUES FOR DETERMINING A LIGHT-BASED COMMUNICATION RECEIVER POSITION

CROSS-REFERENCE TO RELATED APPLICATIONS

This patent application claims the benefit of: U.S. Provisional Patent Application No. 61/970,305, titled "Light Communication Protocol," filed on Mar. 25, 2014; U.S. Provisional Patent Application No. 61/970,307, titled "Light Communication Orientation," filed on Mar. 25, 2014; U.S. Provisional Patent Application No. 61/970,310, titled "Light Communication Receiver," filed on Mar. 25, 2014; U.S. Provisional Patent Application No. 61/970,321, titled "Light Communication Luminaire Positioning," filed on Mar. 25, 2014; and U.S. Provisional Patent Application No. 61/970,325, titled "Light Communication Navigation," filed on Mar. 25, 2014. Each of these patent applications is herein incorporated by reference in its entirety.

FIELD OF THE DISCLOSURE

The present disclosure relates to solid-state lighting (SSL) and more particularly to light-based communication via SSL.

BACKGROUND

Global positioning system (GPS) devices are commonly used to facilitate navigation on Earth. These GPS devices are designed to communicate with orbiting satellites that transmit location and time information. Closer to the Earth's surface, such satellite-based navigation can be supplemented using local area wireless technologies, such as Wi-Fi, which utilize radio frequency (RF) signals to communicate with nearby compatible devices. These types of wireless technologies typically employ wireless access points (Wi-Fi hotspots) to establish network access, and in cases of secured wireless networks, a password or other security credentials normally must be provided in order to gain network access.

BRIEF DESCRIPTION OF THE DRAWINGS

FIG. 8A is a flow diagram illustrating a method of receiving LCom data optionally utilizing multiple light-sensing devices of a computing device, in accordance with an embodiment of the present disclosure.

FIG. 8B is a flow diagram illustrating a method of receiving LCom data optionally utilizing multiple light-sensing devices of a computing device, in accordance with another embodiment of the present disclosure.

Figure 1:
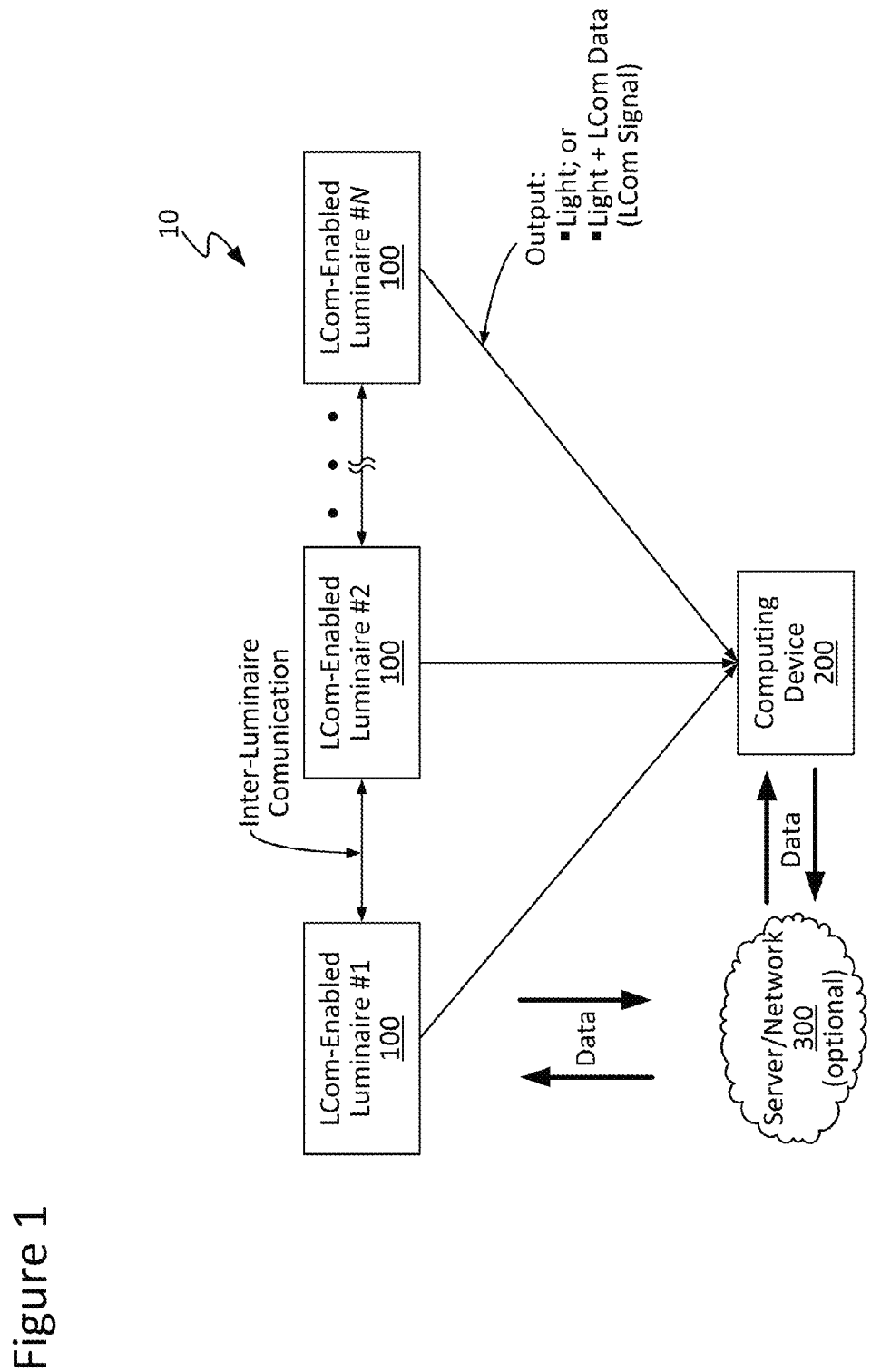
FIG. 1 is a block diagram illustrating an example light-based communication (LCom) system configured in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

General Overview

Existing smartphones and mobile computing devices utilize a combination of global positioning system (GPS) and Wi-Fi technologies to provide navigation capabilities, such as various Wi-Fi positioning systems (WPS). However, these existing GPS-based and Wi-Fi-based techniques suffer from a number of limitations that make their use impractical for indoor navigation. In particular, GPS has an accuracy of only several meters, and the availability and range of Wi-Fi network connections are limited by factors such as the placement of Wi-Fi hotspots, security restrictions imposed by network providers, and other environmental factors. Thus, the combination of GPS and Wi-Fi can fail to achieve sufficiently refined accuracies for purposes of indoor navigation. This is particularly evident in the example context of attempting to navigate a user to an item of interest on a shelf in a retail store. These complications can be compounded by the fact that retail stores are typically hesitant to grant customers access to in-store wireless networks because of potential security risks.

Thus, and in accordance with some embodiments of the present disclosure, techniques are disclosed that can be implemented, for example, as a system for navigation and positioning using light-based communication. As used herein, light-based communication (LCom) generally refers to communication between a solid-state luminaire and a receiver device, such as a smartphone or other mobile computing device, using a pulsing light signal that is encoded with data. In general, the light utilized in LCom may be of any spectral band, visible or otherwise, and may be of any intensity, as desired for a given target application or end-use. In accordance with some embodiments, in an LCom system, a given LCom-enabled luminaire may be configured to transmit a pulsing light signal encoded with data (an LCom signal), and a given receiver device, such as a smartphone or other mobile computing device, may be configured to detect the pulsing light signal encoded with data via one or more light-sensing devices, such as a camera and/or an ambient light sensor, among others.

As will be appreciated in light of this disclosure, there are many non-trivial challenges to establishing and maintaining successful LCom between an LCom-enabled luminaire and a given receiver device, as well as to using LCom to determine location and positioning of the receiver device (and thus the user, if present) for purposes of providing navigation, indoor or otherwise. One such challenge pertains to determining the location of the receiver device relative to a transmitting LCom-enabled luminaire. While the LCom-enabled luminaire may be programmed to know its location in space, that information may be only partially helpful to determining the location of a receiver device, which can be a given distance away from the LCom-enabled luminaire. Another non-trivial challenge pertains to implementing LCom-based positioning and navigation utilizing preexisting infrastructure and hardware, such as cameras and other sensors typically found in existing smartphones and other mobile computing devices. A further non-trivial challenge pertains to pulsing the light output of LCom-enabled luminaires in a manner that is detectable by the receiver device and ensures that ambient light levels are kept constant while minimizing pulsing transitions so as to have only minimal or otherwise negligible impact on light quality and thus not be perceivable to bystanders. Yet another non-trivial challenge pertains to transmitting LCom data in a reasonably brief period of time. In general, a given user may be willing to wait for only a few seconds to gather positioning data via LCom for purposes of indoor navigation. Thus, it may be desirable for the LCom-enabled luminaire to transmit all desired LCom data packets to the receiver device within some optimal, user-configurable, or other designated time window. Still another non-trivial challenge pertains to transmitting LCom data from an LCom-enabled luminaire to a receiver device in an efficient, accurate, and reliable manner. Interruptions in LCom can be caused, for example, by misalignment and movement of the receiver device with respect to the transmitting LCom-enabled luminaire, and an LCom link may be susceptible to breakage, for example, in cases in which the receiver device moves abruptly or continuously (e.g., as may occur when a user is moving around with the receiver device in hand). Accordingly, it may be desirable to minimize or otherwise reduce interruptions in LCom and to correct for faulty LCom data, when present. Another non-trivial challenge pertains to handling multiple LCom signals being simultaneously transmitted within the field of view (FOV) of the receiver device in a manner that minimizes or otherwise reduces data packet collision and channel crosstalk.

As such, some embodiments relate to coding LCom data in a manner that allows for detection thereof, for example, via a standard low-speed smartphone camera. In some cases, the disclosed techniques can be used, for example, in encoding and decoding LCom data in a manner that: (1) prevents or otherwise minimizes perceivable flicker of the light output by a transmitting LCom-enabled luminaire; and/or (2) avoids or otherwise reduces a need for additional, specialized receiver hardware at the receiver computing device. In some cases, the disclosed techniques can be used, for example, to enhance the baud rate between a transmitting LCom-enabled luminaire and a receiver device.

Some embodiments relate to dynamically adjusting light modulation depth based, at least in part, on ambient light levels. Under the disclosed adaptive light modulation scheme, a given LCom-enabled luminaire may be configured to adjust the modulation depth dynamically and/or control the signal-to-noise ratio (SNR) such that the average light signal is kept constant, regardless of what LCom data is being transmitted. In some cases, the disclosed techniques can be used, for example, to dynamically adjust light modulation depth according to a given minimum light modulation depth assessed by measuring the ambient lighting conditions of the environment of the LCom-enabled luminaire. In some instances, an optimized or other target SNR can be provided using the disclosed techniques.

Some embodiments relate to techniques for emitting position information from LCom-enabled luminaires. Luminaire position information may be emitted via an LCom signal that comprises data including the position information. The data may include relative and/or absolute position information for the luminaire and may indicate the physical location of the luminaire. Relative position information for the luminaire may include coordinates relative to a point of origin or physical location within the environment. Absolute position information for the luminaire may include global coordinates for the luminaire. In some cases, the absolute position information for a luminaire may be calculated using position information for the luminaire relative to a point of origin or physical location and the absolute position of the point of origin or physical location. In some embodiments, the data may also include an environment identifier. An environment identifier may indicate the specific entity or type of entity where the luminaire is located, such as a building, train, aircraft, or ship. An environment identifier may also indicate to an LCom receiver which map(s) to use for the interpretation of position information for the luminaire. As will be apparent in light of this disclosure, the techniques for emitting position information from an LCom-enabled luminaire can be used for both stationary and mobile luminaires. In the case of a mobile luminaire, such as a luminaire located in a moving environment (e.g., a train, aircraft, ship, elevator, etc.), the dynamic position information may be updated in real time. For example, in the case of a luminaire in an elevator, the floor position of the luminaire may be updated automatically as it moves between floors.

Some embodiments relate to determining how and when to utilize a given light-sensitive device, such as a camera or an ambient light sensor, of a receiver device for purposes of detecting and decoding the pulsing light of LCom signals transmitted by an LCom-enabled luminaire. In accordance with some embodiments, determination of whether to utilize only a camera, only an ambient light sensor, or a combination thereof in gathering LCom data may be based, in part or in whole, on factors including time, location, and/or context.

Some embodiments relate to providing proper raster line alignment of a camera or other light-sensing device of the receiver device relative to a transmitting LCom-enabled luminaire to establish reliable LCom there between. In some cases, proper alignment can be provided automatically (e.g., by the receiver device and/or other suitable controller). In some cases, proper alignment can be provided by the user. In some instances in which a user is to be involved in the alignment process, the receiver device may be configured to instruct or otherwise guide the user in the process of properly aligning the receiver device relative to a given transmitting LCom-enabled luminaire.

Some embodiments relate to techniques for determining an LCom receiver position. In some such embodiments, the techniques can be used to determine the position of a receiver relative to a specific luminaire within the FOV of the receiver camera. For example, the relative position may be calculated by determining the distance and the orientation of the receiver relative to the luminaire. The distance relative to the luminaire can be calculated using the observed size of the luminaire in an image generated by the receiver camera, the image zoom factor, and actual geometry of the luminaire. The luminaire geometry, such as the length or width of the luminaire, may be received via an LCom signal transmitted from the luminaire or the receiver may retrieve the dimensions in another suitable manner (e.g., via a lookup table). The orientation relative to the luminaire may be determined using a fiducial associated with the luminaire, the fiducial being detectable within the image generated by the camera. An example fiducial may include a special marking on the luminaire, a non-symmetric luminaire design aspect, a unique geometry of the luminaire, or some other aspect of the luminaire recognizable by the receiver camera to be used as an orientation cue. The orientation may also be determined using the yaw, pitch, and roll of the receiver and/or the luminaire. In addition, the orientation may be determined using the absolute heading of the receiver. Once the position of a receiver relative to a luminaire within the FOV of the receiver is determined, the absolute position of the receiver may be calculated using the absolute position of the luminaire. The absolute position of the luminaire may be determined based on an LCom signal received from the luminaire or in another suitable manner, such as via a lookup table using the ID of the luminaire.

Some embodiments relate to techniques for augmenting LCom receiver positioning using, for example, an inertial navigation system (INS). An LCom receiver INS may utilize an on-board accelerometer(s) and/or gyroscopic sensor to calculate, via dead reckoning, the position, orientation, and velocity of the receiver. In this manner, the LCom receiver can calculate its relative position using the INS based on a known starting point. As variously described herein, an LCom receiver may primarily rely on determining its position or location via an LCom signal received from an LCom-enabled luminaire(s) within the receiver FOV. In some cases, the LCom receiver may also or alternatively determine its position or location using GPS, WPS, or some other suitable positioning system. When no LCom signals are in the FOV of the receiver and the link is lost to other positioning systems, the receiver INS may be used to augment the receiver positioning. In some cases, the INS mode runs parallel to other positioning techniques to continuously calculate the relative position of the receiver. In other cases, the INS mode may be activated after losing the link to other positioning systems. In any case, the starting point for the INS mode may be determined using the last known position of the receiver based on an LCom signal, a GPS signal, a WPS signal, and/or using any other suitable positioning technique.

Some embodiments relate to allocating LCom data to be transmitted over multiple colors of light output by multiple LCom-enabled luminaires and transmitting that LCom data in parallel across the multiple colors of light using a time division multiple access (TDMA) scheme. In some cases, the disclosed techniques can be used, for example, to allow for multiple LCom-enabled luminaires to communicate simultaneously with a single receiver device via LCom. In some instances, the disclosed techniques can be used, for example, to permit a greater quantity of LCom-enabled luminaires to be disposed within a given space, thereby providing more accurate positioning, for instance, for indoor navigation. In some cases, the disclosed techniques may be used, for example, to provide a receiver device with the ability to filter multiple LCom signals received from different LCom-enabled luminaires. In some instances, the disclosed techniques can be used, for example, to allow multiple LCom channels to be active simultaneously in an LCom system. In some cases, the disclosed techniques can be used, for example, to provide a redundant channel to which an LCom-enabled luminaire can switch in order to successfully complete transmission when an LCom channel is broken.

Some embodiments relate to multiple panel LCom-enabled luminaires. In some such embodiments, each panel may comprise at least one solid-state light source, where the light sources are configured to output light. The luminaire may also include at least one modulator configured to modulate the light output of the light sources to allow for emission of LCom signals. The luminaire may also include a controller configured to synchronize timing of the LCom signals. With the timing synchronized, one panel may be configured to emit an LCom signal that is the inverse or duplicate of the LCom signal emitted from another panel. Panel signal inversion may be used to, for example, maintain a relatively constant level of light output from the luminaire and/or to create a virtual fiducial to provide orientation information to an LCom receiver. In addition, using a multiple panel luminaire to transmit data may result in improved data transmission rates and transmission reliability compared to, for example, transmitting the same data using a single panel luminaire utilizing the same pulsing frequency.

Some embodiments relate to techniques for spatially resolving received LCom signals. In an example case where one or more LCom signals are in the FOV of an LCom receiver, the image representing the FOV may be segmented into non-overlapping cells, such as hexagonal, triangular, rectangular, or circular shaped cells. Each LCom signal may then be interpreted as a unique pixel cluster comprising one or more of the non-overlapping cells. In some cases, the LCom signals in the FOV may be received from multiple LCom-enabled luminaires and/or a single LCom-enabled luminaire having multiple light panels. Spatially resolving received LCom signals may be assisted by, for example, filtering out pixels that do not carry an LCom signal, using received signal strength indicator (RSSI) information, and adjusting for the orientation/tilt of the LCom receiver. The benefits of being able to spatially resolve received LCom signals can include, but are not limited to, establishing a link with multiple LCom signals within the FOV of a receiver without conflict and/or determining the location of those LCom signals, improving signal to noise ratio, augmenting position information, enhancing sampling frequency, and improving communication speed.

As will be appreciated in light of this disclosure, techniques disclosed herein can be utilized in any of a wide range of LCom applications and contexts. For example, techniques disclosed herein can be utilized, in accordance with some embodiments, in transmitting location and positioning information between an LCom-enabled luminaire and a receiver device. This information may be utilized, in part or in whole, to provide for indoor navigation, in accordance with some embodiments. In some cases, techniques disclosed herein can be utilized as the basis for a positioning and navigation system that may realize improvements in positioning precision and accuracy, for example, over existing GPS-based and WPS-based systems. As such, it follows that techniques disclosed herein can be utilized, in accordance with some embodiments, for commercial endeavors not possible with existing GPS-based and Wi-Fi-based approaches. More particularly, while the limited accuracy of existing GPS-based and Wi-Fi-based approaches is not sufficient for directing a customer to an item of interest on a shelf within a retail store, techniques disclosed herein can be utilized, in accordance with some embodiments, to lead customers directly to in-store promotions and other on-shelf items, as desired. Numerous configurations and variations will be apparent in light of this disclosure.

System Architecture and Operation

FIG. 1 is a block diagram illustrating an example light-based communication (LCom) system 10 configured in accordance with an embodiment of the present disclosure. As can be seen, system 10 may include one or more LCom-enabled luminaires 100 configured for light-based communicative coupling with a receiver computing device 200 via LCom signal(s). As discussed herein, such LCom may be provided, in accordance with some embodiments, via visible light-based signals. In some cases, LCom may be provided in only one direction; for instance, LCom data may be passed from a given LCom-enabled luminaire 100 (e.g., the transmitter) to a computing device 200 (e.g., the receiver), or from a computing device 200 (e.g., the transmitter) to a given LCom-enabled luminaire 100 (e.g., the receiver). In some other cases, LCom may be provided in both or multiple directions; for instance, LCom data may be passed between a given LCom-enabled luminaire 100 and a computing device 200, where both act in a transmitting and receiving (e.g., transceiver) capacity. In some cases in which system 10 includes a plurality of LCom-enabled luminaires 100, all (or some sub-set) of thereof may be configured for communicative coupling with one another (e.g., inter-luminaire communication). In accordance with some embodiments, system 10 optionally may include or otherwise be configured for communicative coupling, for example, with a server/network 300 (discussed below). Communicative coupling may be provided, for example, between server/network 300 and computing device 200 and/or one or more LCom-enabled luminaires 100, as desired.

Figure 2A:
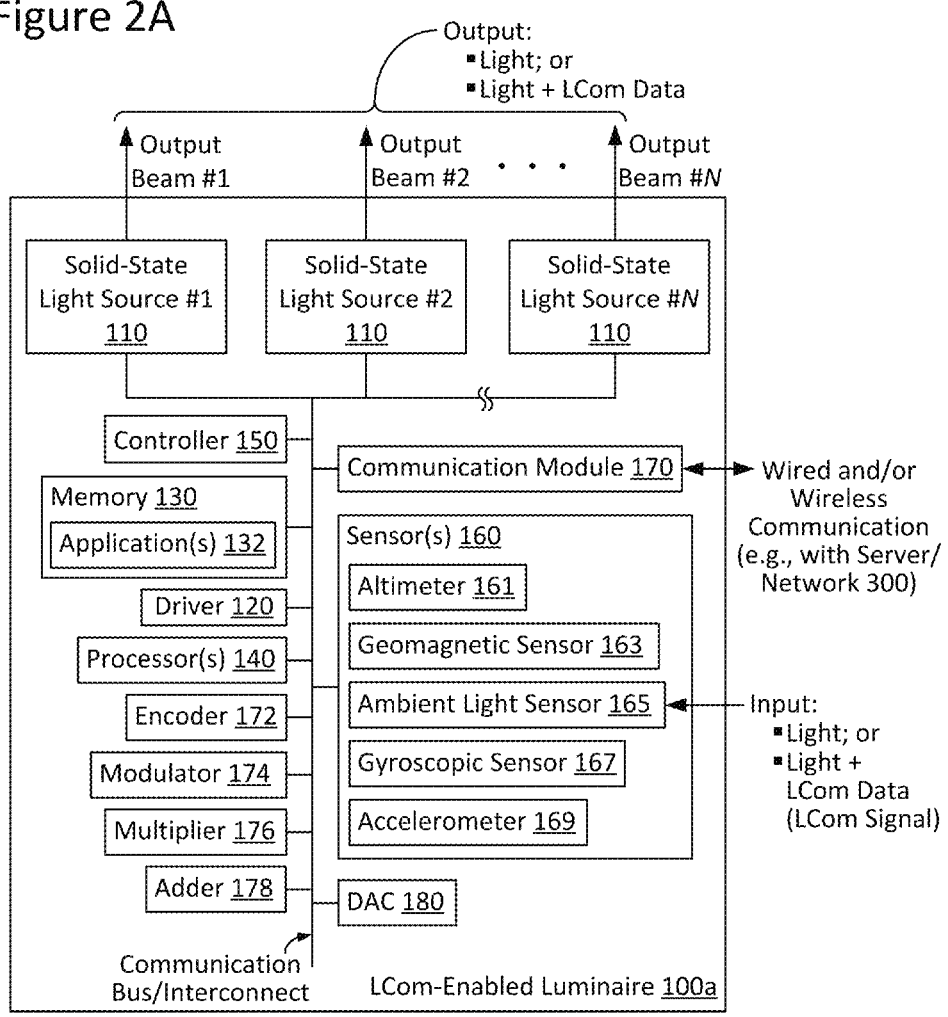
FIG. 2A is a block diagram illustrating an LCom-enabled luminaire configured in accordance with an embodiment of the present disclosure.
Figure 2B:
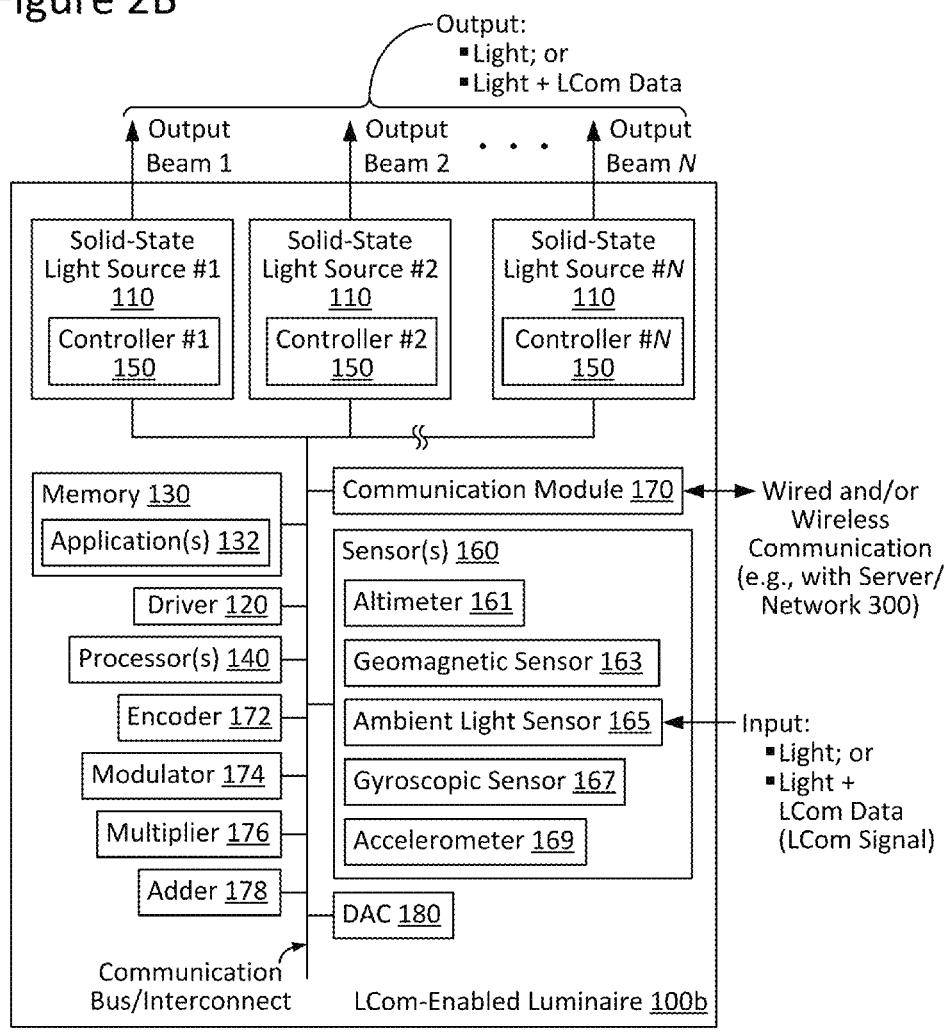
FIG. 2B is a block diagram illustrating an LCom-enabled luminaire configured in accordance with another embodiment of the present disclosure.

FIG. 2A is a block diagram illustrating an LCom-enabled luminaire 100a configured in accordance with an embodiment of the present disclosure. FIG. 2B is a block diagram illustrating an LCom-enabled luminaire 100b configured in accordance with another embodiment of the present disclosure. For consistency and ease of understanding of the present disclosure, LCom-enabled luminaires 100a and 100b hereinafter may be collectively referred to generally as an LCom-enabled luminaire 100, except where separately referenced.

As can be seen, a given LCom-enabled luminaire 100 may include one or more solid-state light sources 110, in accordance with some embodiments. The quantity, density, and arrangement of solid-state light sources 110 utilized in a given LCom-enabled luminaire 100 may be customized, as desired for a given target application or end-use. A given solid-state light source 110 may include one or more solid-state emitters, which may be any of a wide range of semiconductor light source devices, such as, for example: (1) a light-emitting diode (LED); (2) an organic light-emitting diode (OLED); (3) a polymer light-emitting diode (PLED); and/or (4) a combination of any one or more thereof. A given solid-state emitter may be configured to emit electromagnetic radiation (e.g., light), for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness semiconductor light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate, as will be apparent in light of this disclosure. In some cases, power and/or control connections for a given solid-state emitter may be routed from a given PCB to a driver 120 (discussed below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted therethrough. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCom-enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters). To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom-enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be seen from FIGS. 2A-2B, a given LCom-enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCom-enabled luminaire 100 and one or more of the modules thereof (e.g., within memory 130 or elsewhere). In some cases, memory 130 may be configured to be utilized, for example, for processor workspace (e.g., for one or more processors 140) and/or to store media, programs, applications, and/or content on a host LCom-enabled luminaire 100 on a temporary or permanent basis.

The one or more modules stored in memory 130 can be accessed and executed, for example, by the one or more processors 140 of a given LCom-enabled luminaire 100. In accordance with some embodiments, a given module of memory 130 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 130 can be encoded, for example, on a machine-readable medium that, when executed by a processor 140, carries out the functionality of a given LCom-enabled luminaire 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 130 (e.g., one or more applications 132, discussed below) can be implemented in hardware, software, and/or firmware, as desired for a given target application or end-use.

In accordance with some embodiments, memory 130 may have stored therein (or otherwise have access to) one or more applications 132. In some instances, a given LCom-enabled luminaire 100 may be configured to receive input, for example, via one or more applications 132 stored in memory 130 (e.g., such as a lighting pattern, LCom data, etc.). Other suitable modules, applications, and data which may be stored in memory 130 (or may be otherwise accessible to a given LCom-enabled luminaire 100) will depend on a given application and will be apparent in light of this disclosure.

In accordance with some embodiments, the one or more solid-state light sources 110 of a given LCom-enabled luminaire 100 can be electronically controlled, for example, to output light and/or light encoded with LCom data (e.g., an LCom signal). To that end, a given LCom-enabled luminaire 100 may include or otherwise be communicatively coupled with one or more controllers 150, in accordance with some embodiments. In some embodiments, such as that illustrated in FIG. 2A, a controller 150 may be hosted by a given LCom-enabled luminaire 100 and operatively coupled (e.g., via a communication bus/interconnect) with the one or more solid-state light sources 110 (1-N) of that LCom-enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface, optional server/network 300, etc.). As a result, a given LCom-enabled luminaire 100 may be controlled in such a manner as to output any number of output beams (1-N), which may include light and/or LCom data (e.g., an LCom signal), as desired for a given target application or end-use.

However, the present disclosure is not so limited. For example, in some other embodiments, such as that illustrated in FIG. 2B, a controller 150 may be hosted, in part or in whole, by a given solid-state light source 110 of a given LCom-enabled luminaire 100 and operatively coupled (e.g., via a communication bus/interconnect) with the one or more solid-state light sources 110. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCom-enabled luminaire 100 and may do so, for example, based on wired and/or wireless input received from a given local source (e.g., such as on-board memory 130) and/or remote source (e.g., such as a control interface, optional server/network 300, etc.). As a result, LCom-enabled luminaire 110 may be controlled in such a manner as to output any number of output beams (1-N), which may include light and/or LCom data (e.g., an LCom signal), as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCom data for transmission by a given LCom-enabled luminaire 100. In some embodiments, controller 150 may be configured to output a control signal to modulator 174 (discussed below) to facilitate modulation of an LCom signal for transmission by a given LCom-enabled luminaire 100. Other suitable configurations and control signal output for a given controller 150 of a given LCom-enabled luminaire 100 will depend on a given application and will be apparent in light of this disclosure.

In accordance with some embodiments, a given LCom-enabled luminaire 100 may include an encoder 172. In some embodiments, encoder 172 may be configured, for example, to encode LCom data in preparation for transmission thereof by the host LCom-enabled luminaire 100. To that end, encoder 172 may be provided with any suitable configuration, as will be apparent in light of this disclosure.

In accordance with some embodiments, a given LCom-enabled luminaire 100 may include a modulator 174. In some embodiments, modulator 174 may be configured, for example, to modulate an LCom signal in preparation for transmission thereof by the host LCom-enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCom-enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing therethrough, as desired. Other suitable configurations for multiplier 176 will depend on a given application and will be apparent in light of this disclosure.

In accordance with some embodiments, a given LCom-enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing therethrough, as desired. Other suitable configurations for adder 178 will depend on a given application and will be apparent in light of this disclosure.

In accordance with some embodiments, a given LCom-enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCom-enabled luminaire 100 to output an LCom signal therefrom. Other suitable configurations for DAC 180 will depend on a given application and will be apparent in light of this disclosure.

Figure 3:
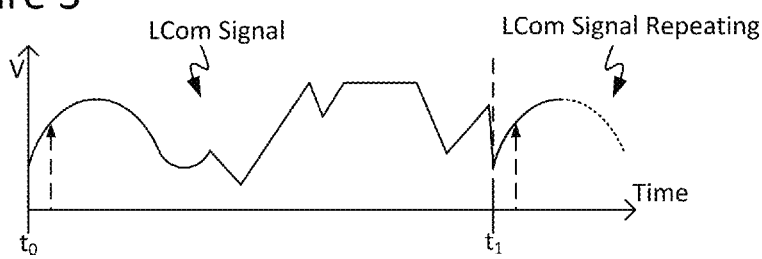
FIG. 3 illustrates an example arbitrary LCom signal as may be transmitted by an LCom-enabled luminaire, in accordance with an embodiment of the present disclosure.

As previously noted, a given LCom-enabled luminaire 100 may be configured, in accordance with some embodiments, to output light and/or light encoded with LCom data (e.g., an LCom signal). FIG. 3 illustrates an example arbitrary LCom signal as may be transmitted by an LCom-enabled luminaire 100, in accordance with an embodiment of the present disclosure. As can be seen here, LCom-enabled luminaire 100 may be configured, in accordance with some embodiments, to transmit a given LCom signal at a given transmission rate over a given time interval ($t_1-t_0$). In some cases, a given LCom-enabled luminaire 100 may be configured to repeatedly output its one or more LCom signals. In any case, the transmission rate may be customized, as desired for a given target application or end-use.

In accordance with some embodiments, a given LCom-enabled luminaire 100 may include one or more sensors 160. In some embodiments, a given LCom-enabled luminaire 100 optionally may include an altimeter 161. When included, altimeter 161 may be configured as typically done, and in some example embodiments may be configured to aid in determining the altitude of a host LCom-enabled luminaire 100 with respect to a given fixed level (e.g., a floor, a wall, the ground, or other surface). In some embodiments, a given LCom-enabled luminaire 100 optionally may include a geomagnetic sensor 163. When included, geomagnetic sensor 163 may be configured as typically done, and in some example embodiments may be configured to determine the orientation and/or movement of a host LCom-enabled luminaire 100 relative to a geomagnetic pole (e.g., geomagnetic north) or other desired heading, which may be customized as desired for a given target application or end-use. In some embodiments, a given LCom-enabled luminaire 100 optionally may include an ambient light sensor 165. When included, ambient light sensor 165 may be configured as typically done, and in some example embodiments may be configured to detect and measure ambient light levels in the surrounding environment of the host LCom-enabled luminaire 100. In some cases, ambient light sensor 165 may be configured to output a signal, for example, to a multiplier 176 of LCom-enabled luminaire 100. In some embodiments, a given LCom-enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCom-enabled luminaire 100. In some embodiments, a given LCom-enabled luminaire 100 optionally may include an accelerometer 169. When included, accelerometer 169 may be configured as typically done, and in some example embodiments may be configured to detect motion of the host LCom-enabled luminaire 100. In any case, a given sensor 160 of a given host LCom-enabled luminaire 100 may include mechanical and/or solid-state componentry, as desired for a given target application or end-use. Also, it should be noted that the present disclosure is not so limited only to these example optional sensors 160, as additional and/or different sensors 160 may be provided, as desired for a given target application or end-use, in accordance with some other embodiments. Numerous configurations will be apparent in light of this disclosure.

In accordance with some embodiments, a given LCom-enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom-enabled luminaires 100. To that end, communication module 170 may be configured to use any suitable wired and/or wireless transmission technologies (e.g., radio frequency, or RF, transmission; infrared, or IR, light modulation; etc.), as desired for a given target application or end-use. Other suitable configurations for communication module 170 will depend on a given application and will be apparent in light of this disclosure.

Figure 4:
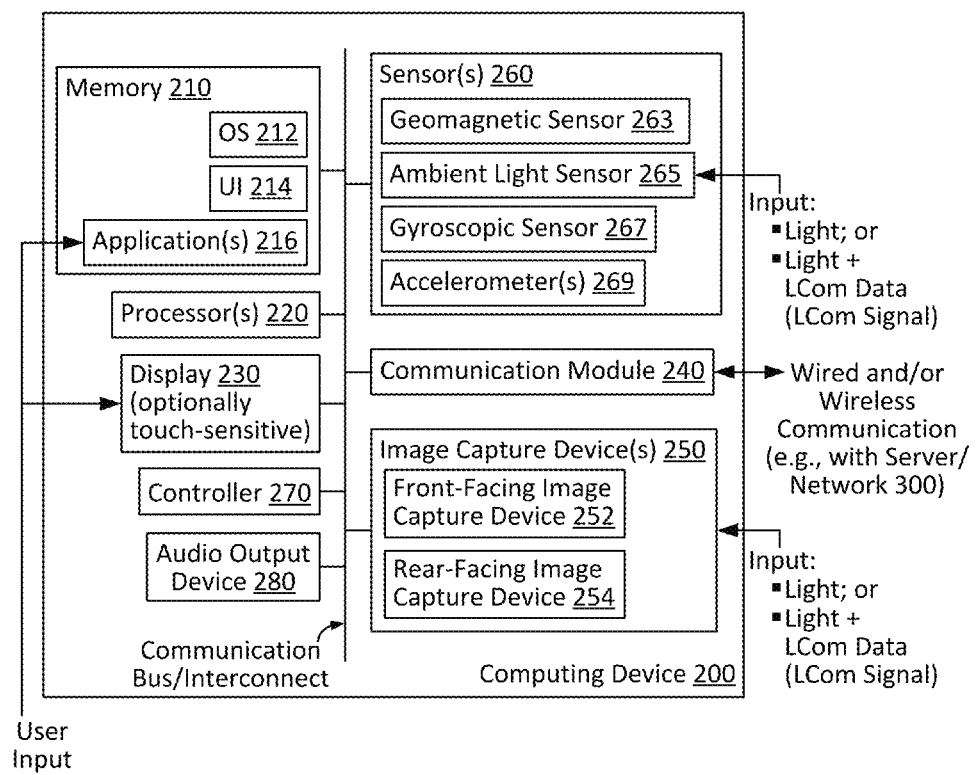
FIG. 4 illustrates an example computing device configured in accordance with an embodiment of the present disclosure.

FIG. 4 illustrates an example computing device 200 configured in accordance with an embodiment of the present disclosure. As discussed herein, computing device 200 may be configured, in accordance with some embodiments: (1) to detect the light pulses of an LCom signal emitted by a transmitting LCom-enabled luminaire 100; and (2) to decode the LCom data from a detected LCom signal. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be seen from FIG. 4, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some embodiments may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis.

The one or more modules stored in memory 210 can be accessed and executed, for example, by the one or more processors 220 of computing device 200. In accordance with some embodiments, a given module of memory 210 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 210 can be encoded, for example, on a machine-readable medium that, when executed by a processor 220, carries out the functionality of computing device 200, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 210 (e.g., such as OS 212, UI 214, and/or one or more applications 216, each discussed below) can be implemented in hardware, software, and/or firmware, as desired for a given target application or end-use.

In accordance with some embodiments, memory 210 may include an operating system (OS) 212. OS 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through computing device 200. Other suitable configurations and capabilities for OS 212 will depend on a given application and will be apparent in light of this disclosure.

In accordance with some embodiments, computing device 200 may include a user interface (UI) module 214. In some cases, UI 214 can be implemented in memory 210 (e.g., as generally shown in FIG. 4), whereas in some other cases, UI 214 can be implemented in a combination of locations (e.g., at memory 210 and at display 230, discussed below), thereby providing UI 214 with a given degree of functional distributedness. UI 214 may be configured, in accordance with some embodiments, to present a graphical UI (GUI) at display 230 that is configured, for example, to aid in carrying out any of the various LCom-related techniques discussed herein. Other suitable configurations and capabilities for UI 214 will depend on a given application and will be apparent in light of this disclosure.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). Other suitable modules, applications, and data which may be stored in memory 210 (or may be otherwise accessible to computing device 200) will depend on a given application and will be apparent in light of this disclosure.

As can be seen further from FIG. 4, computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means.

In some cases, display 230 optionally may be a touchscreen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given GUI action. In some cases, a touch-sensitive display 230 may facilitate user interaction with computing device 200 via the GUI presented by such display 230. Numerous suitable configurations for display 230 will be apparent in light of this disclosure.

In accordance with some embodiments, computing device 200 may include a communication module 240, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCom-enabled luminaires 100. In some cases, communication module 240 of computing device 200 and communication module 170 of a given LCom-enabled luminaire 100 may be configured to utilize the same communication protocol. In some cases, communication module 240 may be configured to communicate with a server/network 300 (discussed below). Other suitable configurations for communication module 240 will depend on a given application and will be apparent in light of this disclosure.

Also, as can be seen from FIG. 4, computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced.

A given image capture device 250 can be any device configured to capture digital images, such as a still camera (e.g., a camera configured to capture still photographs) or a video camera (e.g., a camera configured to capture moving images comprising a plurality of frames). In some cases, a given image capture device 250 may include components such as, for instance, an optics assembly, an image sensor, and/or an image/video encoder, and may be integrated, in part or in whole, with computing device 200. These components (and others, if any) of a given image capture device 250 may be implemented in any combination of hardware, software, and/or firmware, as desired for a given target application or end-use. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCom signal output of a transmitting LCom-enabled luminaire 100. In some instances, a given image capture device 250 may be, for example, a camera like one typically found in smartphones or other mobile computing devices. Other suitable configurations for a given image capture device 250 (e.g., front-facing image capture device 252; rear-facing image capture device 254) of computing device 200 will depend on a given application and will be apparent in light of this disclosure.

In accordance with some embodiments, computing device 200 may include one or more sensors 260. In some embodiments, computing device 200 optionally may include a geomagnetic sensor 263. When included, geomagnetic sensor 263 may be configured as typically done, and in some example embodiments may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured as typically done, and in some example embodiments may be configured to detect and measure ambient light levels in the surrounding environment of the host computing device 200. In some embodiments, computing device 200 optionally may include a gyroscopic sensor 267. When included, gyroscopic sensor 267 may be configured as typically done, and in some example embodiments may be configured to determine the orientation (e.g., roll, pitch, and/or yaw) of the host computing device 200. In some embodiments, computing device 200 optionally may include an accelerometer 269. When included, accelerometer 269 may be configured as typically done, and in some example embodiments may be configured to detect motion of the host computing device 200. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous configurations will be apparent in light of this disclosure.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional server/network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250 (e.g., front-facing image capture device 252 and/or rear-facing image capture device 254). In some instances, a given controller 270 may be configured to output a control signal to control operation of one or more sensors 260. Other suitable configurations and control signal output for a given controller 270 of computing device 200 will depend on a given application and will be apparent in light of this disclosure.

As can be seen further from FIG. 4, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Other suitable types and configurations for audio output device 280 will depend on a given application and will be apparent in light of this disclosure.

Server/network 300 can be any suitable public and/or private communications network. For instance, in some cases, server/network 300 may be a private local area network (LAN) operatively coupled to a wide area network (WAN), such as the Internet. In some cases, server/network 300 may include one or more second-generation (2G), third-generation (3G), and/or fourth-generation (4G) mobile communication technologies. In some cases, server/network 300 may include a wireless local area network (WLAN) (e.g., Wi-Fi wireless data communication technologies). In some instances, server/network 300 may include Bluetooth wireless data communication technologies. In some cases, server/network 300 may include supporting infrastructure and/or functionalities, such as a server and a service provider, but such features are not necessary to carry out communication via server/network 300. In some instances, computing device 200 may be configured for communicative coupling, for example, with a server/network 300 and one or more LCom-enabled luminaires 100. In some cases, computing device 200 may be configured to receive data from server/network 300, for example, which serves to supplement LCom data received by computing device 200 from a given LCom-enabled luminaire 100. In some instances, computing device 200 may be configured to receive data (e.g., such as position, ID, and/or other data pertaining to a given LCom-enabled luminaire 100) from server/network 300 that facilitates indoor navigation via one or more LCom-enabled luminaires 100. In some cases, server/network 300 may include or otherwise have access to one or more lookup tables of data that may be accessed by a computing device 200 communicatively coupled therewith. Numerous configurations for server/network 300 will be apparent in light of this disclosure.

Techniques for Enhancing Baud Rate in LCom

As previously noted, there are a number of non-trivial challenges associated with modulating data over light and transmitting it into space for LCom. For example, to prevent or otherwise minimize visual artifacts and other perceivable changes in light output, it may be desirable to have the LCom light source transmit at a sufficiently high speed. However, effective detection of the modulated light by a given receiver device depends on whether that device has sufficient reception capabilities. Currently available smartphone cameras typically have a maximum frame rate of 30 frames/second (FPS) or 60 FPS, providing only very limited low-speed reception capabilities. As such, there is currently no known way to effectively utilize existing smartphone camera hardware in obtaining data modulated over light without either: (1) making a change in the transmitted light output, which would be perceivable to the user and any bystanders; or (2) adding costly, specialized receiver hardware to the receiver device.

Thus, and in accordance with some embodiments, techniques are disclosed for coding LCom data in a manner that allows for detection thereof via a front-facing image capture device 252 such as, for example, a standard low-speed smartphone camera having a frame rate of 30 FPS. In some cases, the disclosed techniques can be used, for example, in encoding and decoding LCom data in a manner that: (1) prevents or otherwise minimizes perceivable flicker of the light output by a transmitting LCom-enabled luminaire 100; and/or (2) avoids or otherwise reduces a need for additional, specialized receiver hardware at computing device 200. In some cases, the disclosed techniques can be used, for example, to enhance the baud rate between a transmitting LCom-enabled luminaire 100 and a receiving computing device 200. For instance, if front-facing image capture device 252 is a typical smartphone front-facing camera configured to capture images at 30 FPS at VGA resolution (640×480 pixels), and if a standard RGB color profile is utilized, then each frame captured by that front-facing image capture device 252 is about 900 KB of image data (640 pixels×480 pixels×3 colors). Thus, at a frame rate of 30 FPS, that front-facing image capture device 252 may capture about 27 MB of raw image data each second, in accordance with an example embodiment.

Figure 5A:
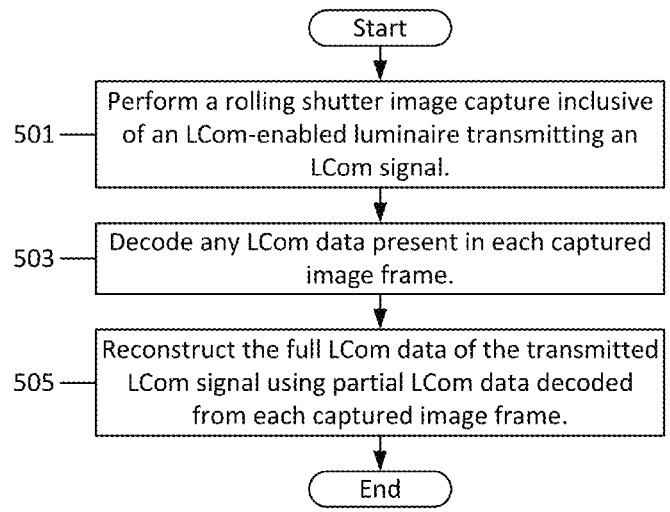
FIG. 5A is a flow diagram illustrating an example process of coding LCom data via a rolling shutter coding scheme, in accordance with an embodiment of the present disclosure.

FIG. 5A is a flow diagram illustrating an example process of coding LCom data via a rolling shutter coding scheme, in accordance with an embodiment of the present disclosure. As can be seen, the flow may begin as in block 501 with performing a rolling shutter image capture inclusive of an LCom-enabled luminaire 100 transmitting an LCom signal. The rolling shutter image capture may be performed, for example, via front-facing image capture device 252 of computing device 200. The duration of the rolling shutter image capture may be customized as desired for a given target application or end-use, and in some cases may be at least as long as the time interval $(t_1-t_0)$ that it takes for LCom-enabled luminaire 100 to make one complete transmission of its LCom data before repeating transmission (e.g., as discussed above with respect to FIG. 3).

Figure 5B:
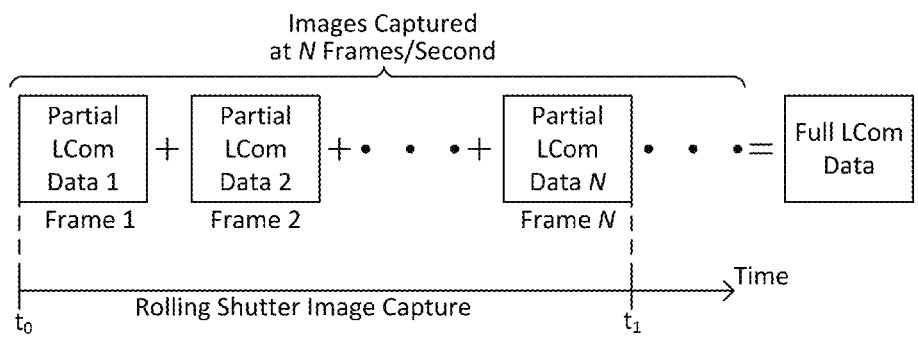
FIG. 5B illustrates an example rolling shutter image capture via a front-facing image capture device in accordance with an embodiment of the present disclosure.

Thereafter, the flow may continue as in block 503 with decoding any LCom data present in each captured image frame. During the rolling shutter image capture, front-facing image capture device 252 may capture a plurality of image frames (Frames 1-N) at a given frame rate (N frames/second). In accordance with some embodiments, front-facing image capture device 252 may be configured to capture images at a frame rate, for example, in the range of about 24-60 FPS, or greater. As can be seen from FIG. 5B, which illustrates an example rolling shutter image capture via front-facing image capture device 252 in accordance with an embodiment of the present disclosure, while only partial LCom data may be captured by front-facing image capture device 252 at any given captured image frame, the plurality of captured image frames (Frames 1-N) contains the full LCom data in the aggregate. Thus, if front-facing image capture device 252 performs a rolling shutter image capture, for example, at a frame rate of 30 FPS, then over a time interval of 1 second, 30 frames of partial LCom data are captured, those image frames containing the full LCom data in the aggregate.

Thereafter, the flow may continue as in block 505 with reconstructing the full LCom data of the transmitted LCom signal using partial LCom data decoded from each captured image frame. As only partial LCom data is received per captured image frame, over a sufficiently long time interval of performing the rolling shutter image capture, the full LCom data packet can be reconstructed utilizing all (or some sub-set) of the partial LCom data captured by front-facing image capture device 252 over the plurality of image frames (1-N). Thus, if a transmitting LCom-enabled luminaire 100 repeatedly transmits its LCom signal at 30 FPS, then a receiving computing device 200 may reconstruct a full LCom data packet, for example, from 60 image frames of partial LCom data received over a time interval of 2 seconds. Reconstruction of the full LCom data may be performed, for example, via a processor 220 of computing device 200, and in some cases may be aided by an application 216 hosted thereby (e.g., in memory 210) or otherwise accessible thereto.

Figure 5C:
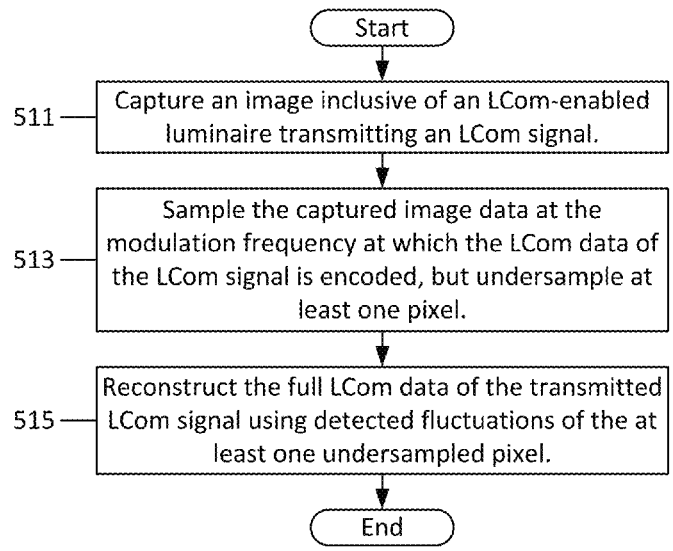
FIG. 5C is a flow diagram illustrating an example process of coding LCom data via an undersampling/aliasing scheme, in accordance with an embodiment of the present disclosure.

FIG. 5C is a flow diagram illustrating an example process of coding LCom data via an undersampling/aliasing scheme, in accordance with an embodiment of the present disclosure. As can be seen, the flow may begin as in block 511 with capturing an image inclusive of an LCom-enabled luminaire transmitting an LCom signal. In accordance with an embodiment, the image capture may be performed, for example, via front-facing image capture device 252 of computing device 200.

Figure 5D:
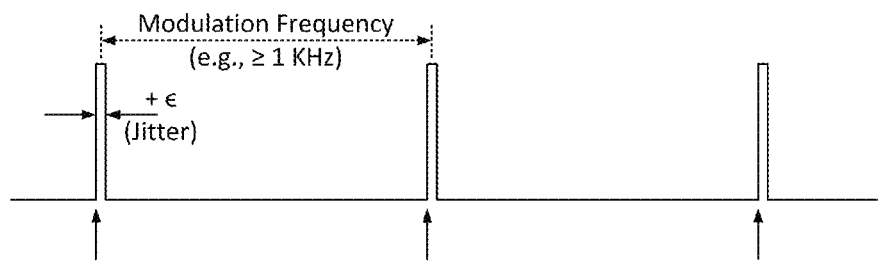
FIG. 5D illustrates an example modulation signal of fixed modulation frequency, in accordance with an embodiment of the present disclosure.

Thereafter, the flow may continue as in block 513 with sampling the captured image data at the modulation frequency at which the LCom data of the LCom signal is encoded, but undersampling at least one pixel. In accordance with some embodiments, LCom-enabled luminaire 100 may be configured to modulate its LCom signal (e.g., via modulator 174) without filtering at a given fixed modulation frequency. For instance, consider FIG. 5D, which illustrates an example modulation signal of fixed modulation frequency, in accordance with an embodiment of the present disclosure. As can be seen here, in some cases, a modulation frequency of greater than or equal to about 1 kHz may be utilized by LCom-enabled luminaire 100 in modulating its LCom data. The present disclosure is not so limited only to this example modulation frequency range, however, as in a more general sense, and in accordance with some embodiments, the modulation frequency may be any suitable frequency sufficient to prevent or otherwise minimize perceivable flicker (e.g., perceivable to a user or any bystanders). In some instances, the fixed modulation frequency optionally may be adjusted to account for jitter (E).

Normally, to reconstruct an unknown analog signal in accordance with the Nyquist criterion, that signal must be sampled at a frequency greater than twice the highest frequency component in the signal. However, if the encoding scheme (e.g., modulation frequency) is known beforehand, then information from the analog LCom signal can be captured and decoded utilizing a much lower sampling rate than normally would be required. Thus, in accordance with some embodiments, the LCom data transmitted by LCom-enabled luminaire 100 may be sampled by computing device 200 at the same modulation frequency at which the LCom data was encoded by LCom-enabled luminaire 100, while undersampling at least one designated pixel. In accordance with some embodiments, the undersampling rate may be, for example, in the range of about 24-60 FPS. In some cases in which front-facing image capture device 252 is, for example, a standard low-speed smartphone camera, the undersampling rate may be 30 FPS or 60 FPS. Other suitable undersampling rates will depend on a given application and will be apparent in light of this disclosure.

Thereafter, the flow may continue as in block 515 with reconstructing the full LCom data of the transmitted LCom signal using detected fluctuations of the at least one undersampled pixel. As previously noted, if the modulation frequency of LCom-enabled luminaire 100 is known beforehand, then the Nyquist criterion can be violated to extract the full LCom data from the LCom signal received by front-facing image capture device 252. Given that the LCom signal transmitted by LCom-enabled luminaire 100 may be repeated (e.g., as discussed above with respect to FIG. 3), the entire LCom data packet may be obtained by front-facing image capture device 252 over a given period of time by detecting the optical intensity of its pixel(s) where the image of an LCom-enabled luminaire 100 is focused and analyzing detected fluctuations of the undersampled pixel(s). More particularly, given that the LCom signal is repeatedly transmitted, a beat frequency between LCom-enabled luminaire 100 and front-facing image capture device 252 may be achieved, at which point computing device 200 may receive the LCom data in a raster scanning manner and reassemble that LCom data into the LCom data packets transmitted by LCom-enabled luminaire 100. Reconstruction of the full LCom data may be performed, for example, via a processor 220 of computing device 200, and in some cases may be aided by an application 216 hosted thereby (e.g., in memory 210) or otherwise accessible thereto.

Numerous variations on the methodologies of FIGS. 5A and 5C will be apparent in light of this disclosure. As will be appreciated, and in accordance with some embodiments, each of the functional boxes (e.g., 501; 503; 505) shown in FIG. 5A and each of the functional boxes (e.g., 511; 513; 515) shown in FIG. 5C can be implemented, for example, as a module or sub-module that, when executed by one or more processors 220 or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field-programmable gate array, purpose-built silicon, etc.).

In accordance with some embodiments, operations associated with the rolling shutter coding scheme and/or the undersampling/aliasing coding scheme described herein can be implemented, for example, utilizing one or more applications 216 on computing device 200 (e.g., within memory 210) or otherwise accessible thereto. As hardware components improve over time, both with respect to the transmitter side (e.g., LCom-enabled luminaire 100) and the receiver side (e.g., computing device 200), features such as high-speed data streaming can be implemented, for example, via software, firmware, hardware, or a combination thereof, in accordance with some embodiments.

As previously noted, in some cases, the disclosed techniques can be used, for example, to allow for detection of data modulation over light for LCom by a given computing device 200 utilizing hardware present in or otherwise already native to that computing device 200. For instance, the disclosed techniques can be used, in an example case, to allow for a standard low-speed camera of a smartphone or other mobile computing device to effectively engage in LCom with one or more LCom-enabled luminaires 100. In some cases, the techniques discussed herein may be provided, in part or in whole, via software without the use of specialized hardware. However, the present disclosure is not so limited, as in some other cases, additional and/or different hardware for detection of LCom data modulation over light may be operatively coupled with computing device 200. For instance, in accordance with some embodiments, a photosensor dongle, a color sensor dongle, or other suitable hardware optionally may be communicatively coupled with computing device 200, as desired for a given target application or end-use. In some such instances, the additional/different light-sensing hardware may be used in conjunction with hardware present in or otherwise already native to the computing device 200 (e.g., such as front-facing image capture device 252), whereas in some other instances, the additional/different light-sensing hardware may be used exclusive of or otherwise in preference over native componentry of computing device 200.

Techniques for Adaptive Light Modulation in LCom

Existing approaches to light-based communication utilize fixed modulation depth. However, given that the selected fixed modulation depth of these approaches must guarantee acceptable SNR under worst-case conditions, it is thus not optimal (that is, not minimal) in more favorable situations and environments. Typically, full-amplitude light modulation for light-based communication negatively impacts emitter efficiency and emissions quality (e.g., as assessed by the flicker value). High-frequency light modulation can reduce this negative impact on light quality, but may not be applicable when relying on low-bandwidth receivers. Also, high-frequency modulation puts additional and stricter requirements, such as load transient response time, on driver electronics, which are more complex and expensive to implement in such approaches.

Figure 6A:
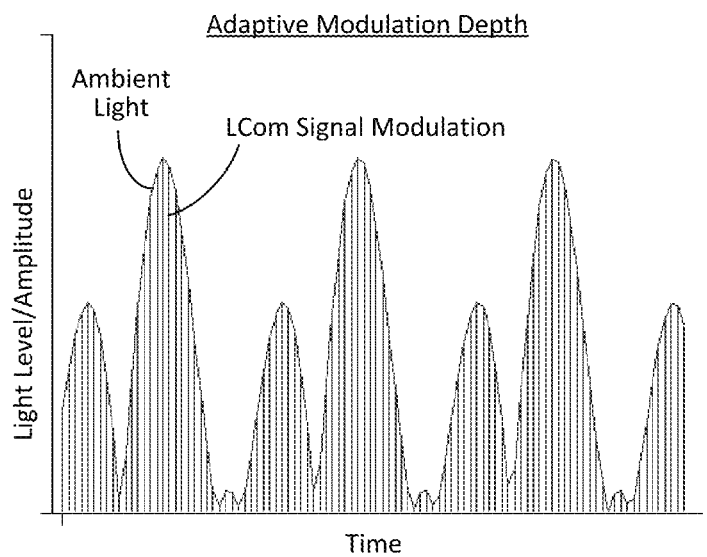
FIG. 6A is a graph illustrating light level as a function of time for an example case of adaptive modulation depth, in accordance with an embodiment of the present disclosure.

Thus, and in accordance with some embodiments, techniques are disclosed for dynamically adjusting light modulation depth based, at least in part, on ambient light levels. Under the disclosed adaptive light modulation scheme, a given LCom-enabled luminaire 100 may be configured to adjust the modulation depth dynamically and/or control the signal-to-noise ratio (SNR) such that the average light signal is kept constant, regardless of what LCom data is being transmitted. For example, consider FIG. 6A, which is a graph illustrating light level as a function of time for an example case of adaptive modulation depth, in accordance with an embodiment of the present disclosure. In accordance with some embodiments, the light modulation depth may be adjusted dynamically, for example, according to a given minimum light modulation depth assessed by measuring the ambient lighting conditions of the environment of the LCom-enabled luminaire 100. In some instances, an optimal or other target SNR can be provided using the disclosed techniques. In a more general sense, and in accordance with some embodiments, the modulation depth associated with the pulsing light signal may be varied, in part or in whole, based on the ambient light level detected, for example, via an ambient light sensor 265.

Figure 6B:
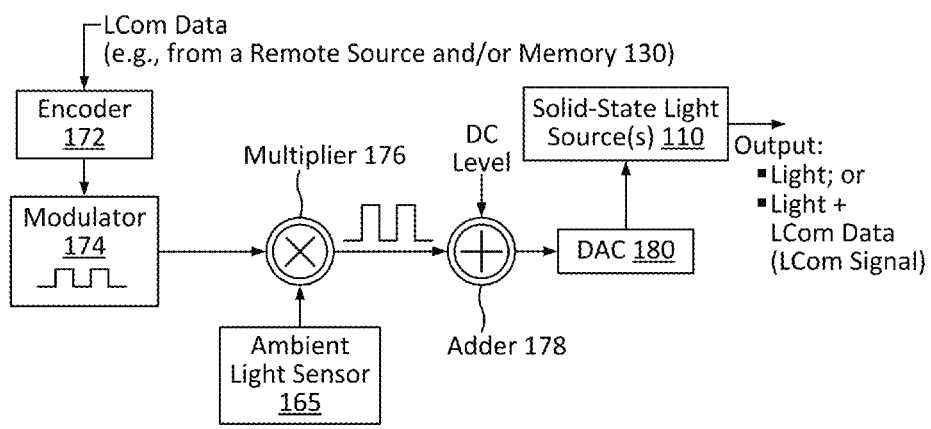
FIG. 6B is a block diagram illustrating a control loop of an LCom-enabled luminaire configured in accordance with an embodiment of the present disclosure.

In accordance with some embodiments, LCom-enabled luminaire 100 may include control circuitry configured to dynamically adjust light modulation depth, for example, based on input parameters derived from ambient light measurements. For example, consider FIG. 6B, which is a block diagram illustrating a control loop of an LCom-enabled luminaire 100 configured in accordance with an embodiment of the present disclosure. As can be seen, in some embodiments, the control loop may include one or more of: (1) an encoder 172; (2) a modulator 174; (3) an ambient light sensor 165; (4) a multiplier 176; (5) an adder 178; and (6) a DAC 180. In accordance with some embodiments, the control loop may be communicatively coupled with one or more solid-state light sources 110. In accordance with some embodiments, the control loop may be configured to adaptively change the modulation amplitude of LCom-enabled luminaire 100 to keep the SNR substantially constant (e.g., precisely constant or otherwise within a given tolerance). In this manner, LCom-enabled luminaire 100 may provide for LCom, for example, even when the ambient light level is not constant. In some cases, a constant SNR may be maintained for the pulsing light signal over a range of modulation depths, in accordance with some embodiments.

Figure 6C:
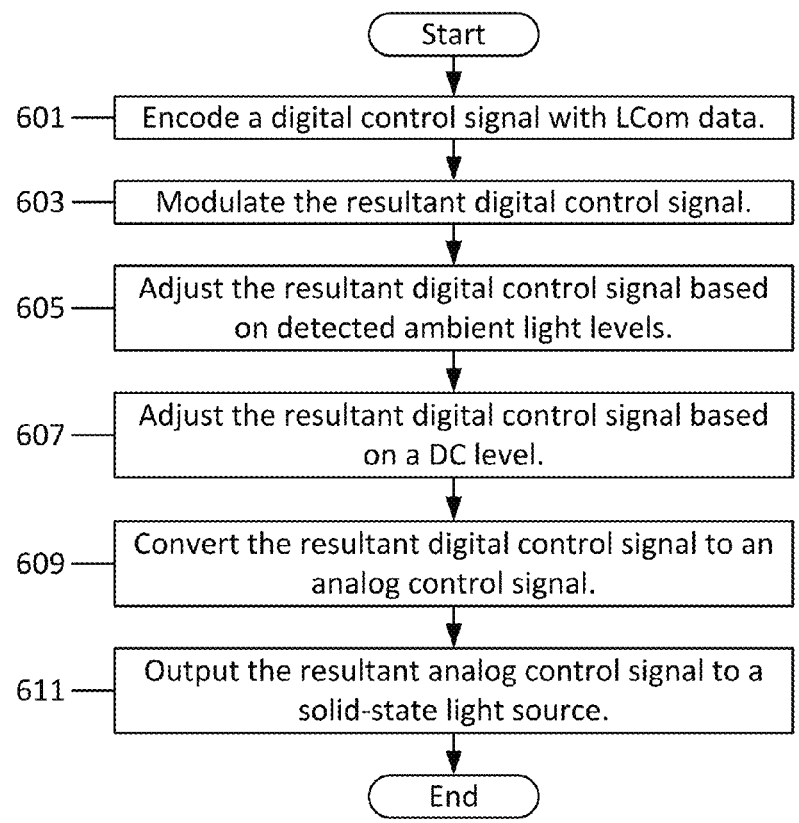
FIG. 6C is a flow diagram illustrating a process of dynamically adjusting the modulation depth of an LCom signal, in accordance with an embodiment of the present disclosure.

FIG. 6C is a flow diagram illustrating a process of dynamically adjusting the modulation depth of an LCom signal, in accordance with an embodiment of the present disclosure. As can be seen, the flow may begin as in block 601 with encoding a digital control signal with LCom data to be transmitted. The LCom data may be provided by a local source (e.g., memory 130) and/or a remote source (e.g., a control interface, optional server/network 300, or other provider via any suitable wired and/or wireless communication means). Encoding may be performed, in part or in whole, via encoder 172 of a given LCom-enabled luminaire 100. In some embodiments, encoder 172 may be configured to encode the LCom data, for example, using Manchester coding (e.g., Phase Encoding or PE). With Manchester coding, the encoding of each LCom data bit may have at least one transition and may occupy the same time. As such, it may have no DC component and may be self-clocking, which means that a clock signal can be recovered from the encoded LCom data. In accordance with some embodiments, use of Manchester coding in the disclosed adaptive light modulation scheme may ensure a constant average light level, regardless of what LCom data is transmitted. It should be noted, however, that the present disclosure is not so limited only to use of Manchester coding, as in accordance with some other embodiments, other types of line coding, such as bi-polar encoding or return-to-zero (RZ) encoding, may be utilized in encoding of the digital control signal with LCom data, as desired for a given target application or end-use.

Thereafter, the flow may continue as in block 603 with modulating the resultant digital control signal. Modulation may be performed, in part or in whole, via modulator 174 of LCom-enabled luminaire 100, in accordance with some embodiments. In some embodiments, modulator 174 may be, for example, a solid-state light source driver (e.g., such as driver 120) configured to output a pulse-width modulation (PWM) signal. Other suitable configurations and outputs for modulator 174 will depend on a given application and will be apparent in light of this disclosure.

Thereafter, the flow may continue as in block 605 with adjusting the resultant digital control signal based on detected ambient light levels. In accordance with some embodiments, detection of ambient light levels may be performed, for example, via ambient light sensor 165 of a given LCom-enabled luminaire 100. In accordance with some embodiments, the amplitude of the signal output (e.g., PWM signal) of modulator 174 may be varied, for example, by multiplying the control signal by a factor that is directly proportional to the amount of ambient light detected by ambient light sensor 165 of LCom-enabled luminaire 100. More particularly, the modulated digital control signal may be multiplied, for example, with binary encoded LCom data (e.g., as encoded by encoder 172), in accordance with some embodiments. Such adjustments of the modulated control signal may be performed, for example, via multiplier 176 of LCom-enabled luminaire 100. Other suitable signal adjustments that may be provided via modulator 174, ambient light sensor 165, and/or multiplier 176 will depend on a given application and will be apparent in light of this disclosure.

Thereafter, the flow may continue as in block 607 with adjusting the resultant digital control signal based on the DC level of LCom-enabled luminaire 100. Adjustment may be performed, in part or in whole, via adder 178 of a given LCom-enabled luminaire 100, in accordance with some embodiments. As will be appreciated in light of this disclosure, the DC level may be set at any threshold value suitable for identifying the encoded LCom data within the encoded, modulated digital control signal and can be customized, as desired for a given target application or end-use.

Thereafter, the flow may continue as in block 609 with converting the resultant digital control signal to an analog control signal. Analog conversion may be performed, in part or in whole, via DAC 180 of LCom-enabled luminaire 100, in accordance with some embodiments. Thereafter, the flow may continue as in block 611 with output of resultant analog control signal to a given solid-state light source 110 of LCom-enabled luminaire 100. In turn, that solid-state light source 110 may output one or more LCom signals, in accordance with some embodiments. In some cases, a given LCom signal (e.g., the encoded LCom data dynamically modulated over light) output by LCom-enabled luminaire 100 may be transmitted to a computing device 200 configured to detect and decode such an LCom signal.

Numerous variations on the methodology of FIG. 6C will be apparent in light of this disclosure. As will be appreciated, and in accordance with some embodiments, each of the functional boxes (e.g., 601; 603; 605: 607; 609; 611) shown in FIG. 6C can be implemented, for example, as a module or sub-module that, when executed by one or more processors 140 or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field-programmable gate array, purpose-built silicon, etc.).

In some cases, flicker values may be kept as low as possible or otherwise improved using techniques disclosed herein. In some cases, the disclosed techniques can be used, for example, to optimize or otherwise improve the efficiency of a given solid-state light source 110 of a given LCom-enabled luminaire 100, for example, in low or otherwise favorable ambient lighting conditions. In some cases, use of the disclosed techniques may permit the use of less complex driver electronics (e.g., driver 120) for solid-state light sources 110, for example, as compared to current light-based communication approaches involving high-speed light modulation. In some cases, use of the disclosed techniques may allow for use of low-bandwidth receivers, such as typical smartphone cameras, in computing device 200 for purposes of LCom.

It should be noted, however, that the present disclosure is not so limited only to dynamic light modulation, as in some other embodiments, full light modulation without ambient light level feedback may be utilized. As will be appreciated in light of this disclosure, utilization of the disclosed adaptive light modulation scheme, a full light modulation scheme, or a high-frequency light modulation scheme may be based, in part or in whole, on considerations related to efficiency, longevity, light quality (e.g., flicker), cost, and/or hardware availability (e.g., inclusion of a photodiode or other suitable light sensor with the receiver computing device 200).

Techniques for Emitting Position Information from LCom-Enabled Luminaires

Figure 7A:
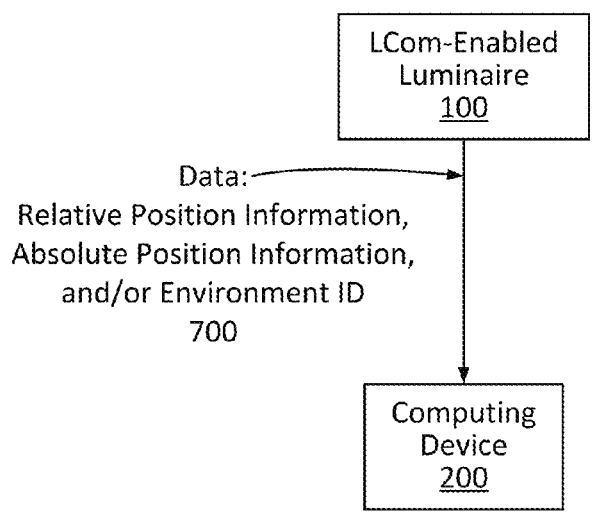
FIG. 7A illustrates an example LCom system, including an LCom-enabled luminaire and a computing device, in accordance with an embodiment of the present disclosure.

FIG. 7A illustrates an example LCom system, including LCom-enabled luminaire 100 and computing device 200, in accordance with an embodiment of the present disclosure. In this example system, LCom-enabled luminaire 100 may be any LCom-enable luminaire as variously described herein. In addition, computing device 200 may be any computing device, as variously described herein, and computing device 200 may be configured to receive LCom signals emitted/transmitted from LCom-enabled luminaire 100. In this example embodiment, luminaire 100 includes at least one light source configured to emit data 700 via an LCom signal, as variously described herein. Data 700 may include position information for the luminaire or its light sources, such as relative and/or absolute position information, as will be described in more detail herein. Data 700 may also include an environment identifier, as will also be described in more detail herein. Data 700 may also include identification (ID) for luminaire 100. In some embodiments, luminaire 100 may include on-board memory 130 that stores data 700 and/or luminaire 100 may include one or more communication modules 170 to receive the position information (e.g., via a wired and/or wireless communication medium). Also, in some embodiments, luminaire 100 may be programmable via, for example, a programming interface that at least allows for the configuration of data 700.

Figure 7B:
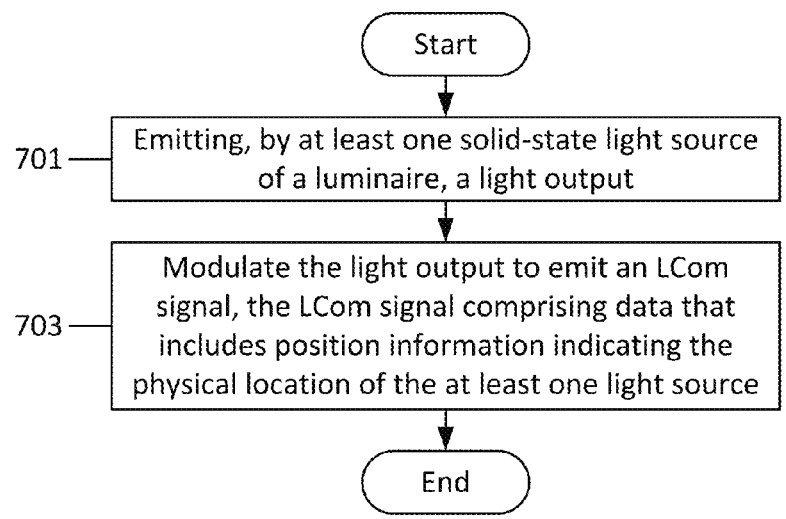
FIG. 7B illustrates an example method for emitting position information from an LCom-enabled luminaire, in accordance with an embodiment of the present disclosure.

FIG. 7B illustrates an example method for emitting position information from an LCom-enabled luminaire, in accordance with an embodiment of the present disclosure. For ease of description, the example LCom system illustrated in FIG. 7A will be used to describe the method of FIG. 7B. However, any suitable LCom system may be used to implement the method of FIG. 7B. The method of FIG. 7B includes emitting 701, by at least one solid-state light source of luminaire 100, a light output. Emission 701 may be performed using any suitable techniques as variously described herein. The method of FIG. 7B continues with modulating 703 the light output to emit an LCom signal, the LCom signal comprising data 700 that includes position information indicating the physical location of the at least one light source and/or luminaire 100. Modulating 703 may be performed using at least one modulator 174 and any other componentry, as will be apparent in light of the present disclosure. Data 700 may include relative position information, absolute position information, and/or an environment identifier (ID). In embodiments where the environment identifier (ID) is included in data 700, the environment ID may indicate which map(s) to use for interpretation of the position information, as will be described in more detail herein. In addition, the environment ID may indicate the type of entity where luminaire 100 is located, such as a train, aircraft, ship, elevator, etc. Further, the environment ID may indicate the specific entity where luminaire 100 is located, such as a specific retail store building, a specific naval ship, a specific elevator within a building, etc.

In some embodiments, data 700 includes relative position information for luminaire 100. In some cases, the relative position information includes coordinates relative to a point of origin or physical location within the environment of luminaire 100. In some cases, the relative position information includes the six degrees of freedom offsets relative to a point of origin or physical location, which can include height offset, offset in the north/south direction, offset in the west/east direction, and/or pitch, roll, and yaw of luminaire 100. In some such cases, the point of origin and/or position information for the point of origin may be provided using data 700, the environment ID, and/or the luminaire ID (e.g., using a lookup table). In some cases, data 700 may include relative position information for helping to determine the physical location of luminaire 100. Emitting relative position information may be particularly beneficial for moving/mobile luminaires, such as luminaires in ships, trains, aircrafts, and elevators, for example. In the case of moving/mobile luminaires, the dynamic position information may be updated in real time. For example, in the case of a luminaire in an elevator, the floor position of the luminaire may be updated in real time as it moves between floors, using any suitable technique as will be apparent in light of this disclosure.

In some embodiments, data 700 includes absolute position information for luminaire 100. In some cases, the absolute position information may include the global coordinates of luminaire 100. In some such cases, the global coordinates may be obtained via a GPS receiver. In some cases, the absolute position information may include position information for luminaire 100 relative to a point of origin and the absolute position of the point of origin. In some such cases, the point of origin and/or position information for the point of origin may be provided using data 700, the environment ID, and/or the luminaire ID (e.g., using a lookup table). In some cases, data 700 may include absolute position information for helping to determine the physical location of luminaire 100. The absolute position information may be static if luminaire 100 is located within a building, for example, and the absolute position information may be dynamic if luminaire 100 is located within a moving environments, such as a ship, train, aircraft, or elevator, for example. In the case of moving/mobile luminaires, the dynamic position information may be updated automatically or in real time. For example, in the case of a luminaire in a ship, the absolute position information of the luminaire (e.g., the global coordinates) and/or the absolute position information for a point of origin or physical location used to calculate the absolute position of the luminaire may be updated in real time as the ship moves, using any suitable technique as will be apparent in light of this disclosure.

An example alternative to the techniques for emitting position information from an LCom-enabled luminaire includes receiving a luminaire identifier (ID) via an LCom signal, but no position information, and then determining the position of the luminaire using the ID (e.g., via a lookup table). However, such an alternative may consume more memory, lead to higher computational overhead, and/or consume more energy or power. Therefore, the techniques variously described herein can be used to more effectively and/or efficiently provide luminaire position information. In addition, by emitting position information from the luminaire via an LCom signal, the techniques may allow for a more open protocol where receivers can decode and use the position information directly without referring to lookup tables, for example. In addition, the techniques may provide benefits for mobile luminaires, such as being able to update dynamic position information in real time at the luminaire without having to update an external source, such as a lookup table, for example. Such benefits can also be realized when luminaires are moved to a different location. Additional benefits of the techniques will be apparent in light of the present disclosure.

Techniques for Selective Use of Light-Sensing Devices in LCom

As will be appreciated in light of this disclosure, the cameras and sensors native to existing smartphones and other mobile computing devices are not originally designed for LCom. As such, there are a number of non-trivial challenges associated with establishing LCom between luminaires and receiver devices using such cameras and sensors. In addition, there are non-trivial challenges in using such devices to calculate positioning, for example, for purposes of indoor positioning.

Thus, and in accordance with some embodiments, techniques are disclosed for determining how and when to utilize a given light-sensitive device (e.g., a front-facing image capture device 252; a rear-facing image capture device 254; an ambient light sensor 265) of a computing device 200 for purposes of detecting the pulsing light of LCom signals transmitted by an LCom-enabled luminaire 100. In accordance with some embodiments, determination of whether to utilize only an image capture device 250, only an ambient light sensor 265, or a combination thereof in gathering LCom data may be based, in part or in whole, on factors including time, location, and/or context.

Figure 8C:
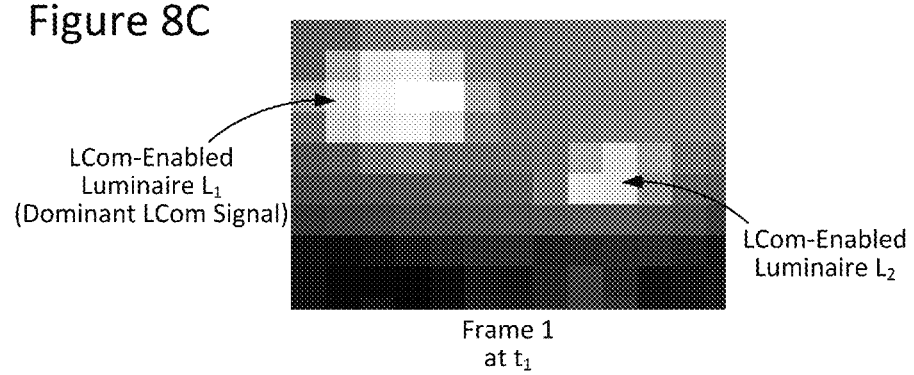
FIGS. 8C and 8D are two example image frames of magnified pixel output of a front-facing image capture device receiving light input from two separate transmitting LCom-enabled luminaires, in accordance with an embodiment of the present disclosure.

FIG. 8A is a flow diagram illustrating a method of receiving LCom data optionally utilizing multiple light-sensing devices of a computing device 200, in accordance with an embodiment of the present disclosure. As can be seen, the flow may begin as in block 801 with detecting an LCom signal with a first light-sensing device at a first sampling rate. In some embodiments, the first light-sensing device may be, for example, an image capture device 250 of computing device 200. In some such cases, the first sampling rate may be, for example, in the range of about 24-60 frames per second (FPS). In some other embodiments, the first light-sensing device may be, for example, an ambient light sensor 265 of computing device 200. In some such cases, the first sampling rate may be, for example, in the range of about 300 Hz or greater. Other suitable light-sensing devices and sampling rates will depend on a given application and will be apparent in light of this disclosure.

Thereafter, the flow may continue as in block 803 with decoding first LCom data from the detected LCom signal, and as in block 805 with analyzing the first LCom data. In accordance with some embodiments, decoding and/or analyzing of the first LCom data may be performed, in part or in whole, via one or more processors 220 of computing device 200. In some cases, decoding and/or analysis of the first LCom data may be facilitated via one or more applications 216 of computing device 200.

In some cases, the flow optionally may continue thereafter as in block 807 with detecting the LCom signal with a second light-sensing device at a second sampling rate. If the first light-sensing device is an ambient light sensor 265 of computing device 200, then in some cases the second light-sensing device may be, for example, an image capture device 250 of computing device 200. If instead the first light-sensing device is an image capture device 250 of computing device 200, then in some cases the second light-sensing device may be, for example, an ambient light sensor 265 of computing device 200. As will be appreciated in light of this disclosure, the second sampling rate may be any of the example sampling rates discussed above, for instance, with respect to the first sampling rate of the first light-sensing device of computing device 200, in accordance with some embodiments. In some cases, the second sampling rate may be substantially the same as (e.g., exactly the same as or within a given tolerance of) the first sampling rate. In some other cases, the second sampling rate may be different from the first sampling rate.

Thereafter, the flow optionally may continue as in block 809 with decoding second LCom data from the detected LCom signal, and as in block 811 with analyzing the second LCom data. In accordance with some embodiments, decoding and/or analyzing of the second LCom data may be performed, in part or in whole, via one or more processors 220 of computing device 200. In some cases, decoding and/or analysis of the second LCom data may be facilitated via one or more applications 216 of computing device 200.

FIG. 8B is a flow diagram illustrating a method of receiving LCom data optionally utilizing multiple light-sensing devices of a computing device 200, in accordance with another embodiment of the present disclosure. As can be seen, the flow may begin as in block 821 with detecting an LCom signal with a first light-sensing device at a first sampling rate and with a second light-sensing device at a second sampling rate. As will be appreciated in light of this disclosure, the first and second light-sensing device can be any one or more of those discussed above, for instance, with respect to FIG. 8A (e.g., an image capture device 250; an ambient light sensor 265). As will be further appreciated, the first and second sampling rates may be any of the example sampling rates discussed above, for instance, with respect to FIG. 8A. In some cases, the first and second sampling rates may be substantially the same (e.g., exactly the same or within a given tolerance). In some other cases, the first and second sampling rates may be different from one another.

Thereafter, the flow may continue as in block 823 with decoding first and second LCom data from the detected LCom signal, and as in block 825 with analyzing the first and second LCom data. In accordance with some embodiments, decoding and/or analyzing of the first and second LCom data may be performed, in part or in whole, via one or more processors 220 of computing device 200. In some cases, decoding and/or analysis of the first and second LCom data may be facilitated via one or more applications 216 of computing device 200.

In some cases, detection of an LCom signal with a second light-sensing device may be performed, for example, at some time subsequent to detection of that LCom signal with a first light-sensing device (e.g., as in FIG. 8A); that is, detection via the first and second light-sensing devices may be performed consecutively, in accordance with some embodiments. In some such cases, only one of the first and second light-sensing devices may be performing detection of the LCom signal at a given time. In some other such cases, one of the first and second light-sensing devices may be performing detection of the LCom signal, and then the other of the first and second light-sensing devices may begin performing simultaneous detection of the LCom signal at a later time. In some other cases, detection of an LCom signal with a second light-sensing device may be performed, for example, at the same time as detection of that LCom signal with a first light-sensing device (e.g., as in FIG. 8B); that is, detection via the first and second light-sensing devices may be performed simultaneously, in accordance with some embodiments. In some such cases, both of the first and second light-sensing devices may begin performing detection of the LCom signal at the same time. In accordance with some embodiments, detection via the first and/or second light-sensing devices may be performed continuously, periodically, or otherwise as desired for a given target application or end-use.

In some cases, the first and second LCom data may be different, in part or in whole, from one another. In some other cases, the first and second LCom data may be duplicative, in part or in whole, of one another. In some instances, one or both of the first and second LCom data may be low-speed LCom data (e.g., as can be detected by an image capture device 250). In some instances, one or both of the first and second LCom data may be high-speed LCom data (e.g., as can be detected by an ambient light sensor 265). In accordance with some embodiments, either or both of the first and second light-sensing devices may be enabled in response to at least one of detection, decoding, and/or analysis of a given LCom signal. In accordance with some embodiments, either or both of the first and second light-sensing devices may be disabled in response to at least one of detection, decoding, and/or analysis of a given LCom signal.

Numerous variations on the methodologies of FIGS. 8A and 8B will be apparent in light of this disclosure. As will be appreciated, and in accordance with some embodiments, each of the functional boxes (e.g., 801; 803; 805; 807; 809; 811) shown in FIG. 8A and each of the functional boxes (e.g., 821; 823; 825) shown in FIG. 8B can be implemented, for example, as a module or sub-module that, when executed by one or more processors 220 or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field-programmable gate array, purpose-built silicon, etc.).

As previously noted, either or both of the first and second light-sensing devices of the flows of FIG. 8A-8B can be, in accordance with some embodiments, an image capture device 250 (e.g., front-facing image capture device 252; rear-facing image capture device 254) of computing device 200. Depending on its particular configuration, a given image capture device 250 may be capable of detecting millions of pixels (e.g., 1,000×1,000 pixels or more, as desired for a given target application or end-use), whereas ambient light sensor 265 may be considered, in a general sense, a single-pixel image capture device capable of detecting only the average value of light coming through its optics. Thus, as will be appreciated in light of this disclosure, there is a wide range of contexts in which it may be desirable, for example, to utilize a front-facing image capture device 252 exclusive of (or otherwise in preference over) ambient light sensor 265 in detecting LCom signals.

For instance, as will be appreciated in light of this disclosure, in commencing LCom-based indoor navigation, it may be desirable to ensure calculation of an accurate and reliable point of reference for a given indoor navigation map. As will be further appreciated, front-facing image capture device 252 generally may be better suited to that end than ambient light sensor 265. Thus, in accordance with some embodiments, front-facing image capture device 252 may be utilized exclusive of (or otherwise in preference over) ambient light sensor 265, for example, to collect LCom information during an initial positioning determination for purposes of calculating a given point of reference in LCom-based indoor navigation. Though front-facing image capture device 252 may have a lower sampling rate than ambient light sensor 265, and thus decoding of a received LCom signal may take longer, a user generally may be more forgiving of time delays at the beginning of the indoor navigation process, understanding that it may take a little time to initiate.

As will be appreciated in light of this disclosure, during an LCom-based indoor navigation session, computing device 200 may detect unreliable LCom data (e.g., via ambient light sensor 265) resulting, for instance, from crosstalk between neighboring LCom-enabled luminaires 100 or poor rate line alignment between computing device 200 and a given transmitting LCom-enabled luminaire 100. In accordance with some embodiments, if an unreliable LCom signal is detected, then front-facing image capture device 252 may be utilized exclusive of (or otherwise in preference over) ambient light sensor 265, for example: (1) to resolve any LCom crosstalk by determining which LCom-enabled luminaire 100 is transmitting which LCom signal; and/or (2) to assist a user in aligning computing device 200 with respect to a given LCom-enabled luminaire 100 (as discussed herein). As will be further appreciated, it may be desirable to remedy these conditions, for example, for purposes of reliably and accurately calculating absolute position from available LCom signals, and in some cases, front-facing image capture device 252 generally may be better suited to that end than ambient light sensor 265. After resolving any crosstalk, front-facing image capture device 252 may continue to be utilized, for example, in detecting any available LCom signal(s), in accordance with some embodiments.

In accordance with some embodiments, front-facing image capture device 252 may be utilized exclusive of (or otherwise in preference over) ambient light sensor 265, for example, in gathering reliable and accurate LCom data from a given LCom-enabled luminaire 100 at a periodic interval, a user-configurable interval, or otherwise as frequently as desired for a given target application or end-use. In some cases, this may help to reduce taxing of system resources (e.g., hardware, software, and/or firmware) of computing device 200 or otherwise schedule periods of higher resource usage at more convenient times for computing device 200.

Also, as previously noted, either of the first or second light-sensing devices of the flows of FIGS. 8A-8B can be, in accordance with some embodiments, an ambient light sensor 265 of computing device 200. Depending on its particular configuration, ambient light sensor 265 may be capable of being sampled at a higher sampling rate (e.g., about 300 Hz or more, as desired for a given target application or end-use) than front-facing image capture device 252, which may have a relatively limited frame rate of only 24-60 FPS. Also, depending on its particular configuration, reading/sampling of ambient light sensor 265 may consume fewer system resources (e.g., hardware, software, and/or firmware resources) of a host computing device 200 than reading/sampling of a front-facing image capture device 252 hosted thereby. Furthermore, depending on its particular configuration, ambient light sensor 265 and front-facing image capture device 252 may be distinct from one another and thus utilization of ambient light sensor 265 in detecting light may not restrict the ability to utilize front-facing image capture device 252 in capturing image data (e.g., taking pictures/video; scanning a code; etc.). Thus, as will be appreciated in light of this disclosure, there is a wide range of contexts in which it may be desirable, for example, to utilize ambient light sensor 265 exclusive of (or otherwise in preference over) front-facing image capture device 252 in detecting LCom signals.

In accordance with some embodiments, ambient light sensor 265 may be utilized exclusive of (or otherwise in preference over) front-facing image capture device 252, for example, to constantly monitor the surrounding environment for LCom signals from any available LCom-enabled luminaires 100. This may be desirable, for example, in some cases in which computing device 200 is constantly or otherwise frequently moving around. Also, as will be appreciated in light of this disclosure, ambient light sensor 265 may be relatively easier to poll than front-facing image capture device 252. In an example case, ambient light sensor 265 may detect a change (e.g., a relative change or a coarse update) in a light pattern sensed from the surrounding environment, signifying that computing device 200 has moved to a location near a different transmitting LCom-enabled luminaire 100. In some such cases, front-facing image capture device 252 thereafter may be utilized, for example, to establish a reliable signal with the nearby LCom-enabled luminaire 100, in accordance with some embodiments.

In accordance with some embodiments, ambient light sensor 265 may be utilized exclusive of (or otherwise in preference over) front-facing image capture device 252, for example, in correcting errors in LCom data streams received by front-facing image capture device 252 during interruptions caused, for instance, by abrupt movements of computing device 200. To that end, ambient light sensor 265 may be utilized, for example, to detect light pulses from a given transmitting LCom-enabled luminaire 100 to fill in for missing LCom data, in accordance with some embodiments. For instance, consider the example case in which computing device 200 is tilted such that a given LCom-enabled luminaire 100 that was initially within the FOV of front-facing image capture device 252 is now no longer within the FOV, temporarily or otherwise. In some instances, ambient light sensor 265 still may be at least somewhat aligned with that LCom-enabled luminaire 100, and thus it can be used in detecting LCom signals from the LCom-enabled luminaire 100, for example, until front-facing image capture device 252 is once again sufficiently aligned therewith, in accordance with some embodiments. Also, in cases in which computing device 200 includes a gyroscopic sensor 267, tilt angle and other information may be available for that computing device 200 to make intelligent decisions with regard to how to fill in the missing LCom data, in accordance with some embodiments.

Figure 8D:
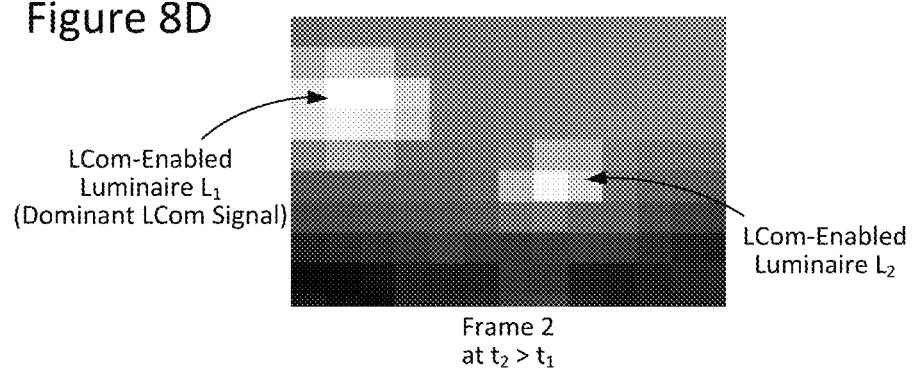
Figure 8E:
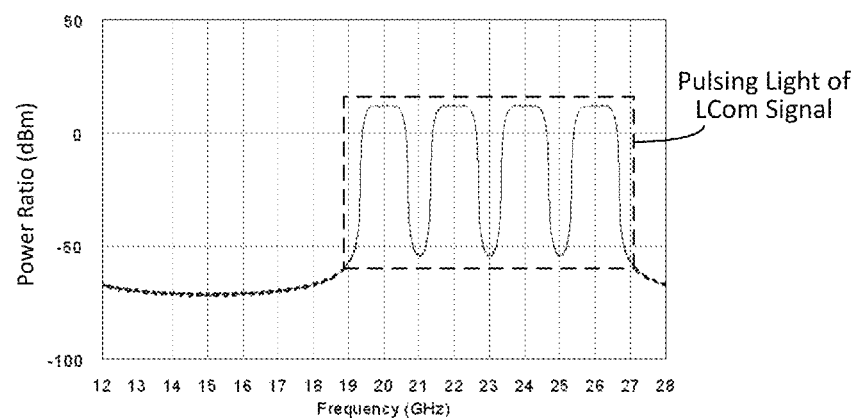
FIG. 8E is a graph of power ratio as a function of frequency illustrating an example output signal of an ambient light sensor receiving LCom signal input from two separate transmitting LCom-enabled luminaires, in accordance with an embodiment of the present disclosure.

In accordance with some embodiments, ambient light sensor 265 may be utilized exclusive of (or otherwise in preference over) front-facing image capture device 252, for example, to sample at higher speeds in effort to detect the presence of high-speed LCom data signals. For instance, consider the example case in which an LCom-enabled luminaire 100 initially transmits LCom data (e.g., such as its position and/or other indoor navigation information) with a comparatively slower pulse speed that can be detected by front-facing image capture device 252 of computing device 200, and then transmits additional LCom data (e.g., such as an in-store promotional special/sale and/or other indoor navigation information) with a comparatively higher pulse speed that can be detected by ambient light sensor 265 of computing device 200, in accordance with some embodiments. To that end, depending on its particular configuration, ambient light sensor 265 may be generally better suited than front-facing image capture device 252 at detecting high-speed light pulses. To illustrate, consider FIGS. 8C and 8D, which are two example image frames of magnified pixel output of a front-facing image capture device 252 receiving LCom signal input from two separate transmitting LCom-enabled luminaires 100, in accordance with an embodiment of the present disclosure. As demonstrated here, as between the two different image frames (one frame at time $t_1$; the other frame 66 ms later at time $t_2$), the pulsing light of the LCom signal transmitted by the two source LCom-enabled luminaires 100 may not be effectively detected across the frames of pixel output of front-facing image capture device 252 having a frame rate, for example, of 30 FPS or 60 FPS. Contrariwise, consider FIG. 8E, which is a graph of power ratio as a function of frequency illustrating an example output signal of an ambient light sensor 265 receiving LCom signal input from two separate transmitting LCom-enabled luminaires 100, in accordance with an embodiment of the present disclosure. As demonstrated here, the pulsing light of the LCom signal transmitted by the source LCom-enabled luminaires 100 is clearly detected by ambient light sensor 265, as evidenced by the graphed output (twenty plotted data points over 66 ms) of ambient light sensor 265 having a sampling rate, for example, of 300 Hz. In some cases, use of ambient light sensor 265 in detecting high-speed LCom signals may help to prevent or otherwise reduce any need for making hardware and/or driver changes to a computing device 200, such as a smartphone or other mobile computing device.

As will be appreciated in light of this disclosure, the front-facing image capture device 252 of computing device 200 may be utilized in many different ways by computing device 200 (e.g., by any of a wide range of different applications 216 thereof). As such, there may be occasions where a user wishes to utilize some other function of computing device 200, temporarily or otherwise, while LCom is active. For instance, in an example case, a user may wish to utilize computing device 200 to scan a bar code or a quick response (QR) code of a product. In some such cases, to that end, computing device 200 may disable front-facing image capture device 252 and instead enable rear-facing image capture device 254. In another example case, a user may wish to utilize computing device 200 to make a telephone call or engage in some other communication session. In some such cases, to that end, computing device 200 may disable one or both of front-facing image capture device 252 and rear-facing image capture device 254. Thus, in accordance with some embodiments, ambient light sensor 265 may be utilized exclusive of (or otherwise in preference over) front-facing image capture device 252, for example, to detect incoming LCom signals, keeping LCom active in such scenarios.

As will be further appreciated in light of this disclosure, there is also a wide range of contexts in which it may be desirable, for example, to utilize front-facing image capture device 252 and ambient light sensor 265 in conjunction with one another in detecting LCom signals. For instance, in accordance with some embodiments, ambient light sensor 265 may be utilized to detect transmitted LCom light pulses within its FOV, and front-facing image capture device 252 may be utilized to determine the location of the LCom-enabled luminaire 100 that is the source of the most dominant LCom signal. This information may be combined and decoded, in accordance with some embodiments, to determine where the transmitting LCom-enabled luminaire is located and what LCom data is being transmitted thereby.

Depending on its particular configuration, ambient light sensor 265 may be capable of sampling LCom light pulses faster than front-facing image capture device 252, and front-facing image capture device 252 may be capable of more readily detecting the source LCom-enabled luminaire 100. Thus, in accordance with some embodiments, ambient light sensor 265 may be utilized to detect high-frequency LCom data signals, while front-facing image capture device 252 may be utilized to resolve the source LCom-enabled luminaire 100 of that high-speed LCom data, and computing device 200 can utilize both pieces of information in decoding high-frequency LCom signals. For instance, consider the example case in which front-facing image capture device 252 has two neighboring LCom-enabled luminaires 100 within its FOV—one to the left of computing device 200 and the other to the right of computing device 200. Based on LCom data gathered by front-facing image capture device 252, computing device 200 may provide instructions to tilt it towards a certain one of the adjacent LCom-enabled luminaires 100, and ambient light sensor 265 then may be utilized to sense the light pulses at a comparatively higher speed than could be provided by front-facing image capture device 252, in accordance with some embodiments. Computing device 200 then may identify which LCom-enabled luminaire 100 is communicating and therefore determine how to utilize the LCom light pulses detected by ambient light sensor 265, in accordance with an embodiment. Likewise, front-facing image capture device 252 can be utilized, in accordance with some embodiments, to determine when to read ambient light sensor 265, such as when that ambient light sensor 265 is much closer to one LCom-enabled luminaire 100 than another LCom-enabled luminaire 100 so as to minimize or otherwise reduce crosstalk.

In some cases, when front-facing image capture device 252 is aimed, for example, at an overhead transmitting LCom-enabled luminaire 100, the contrast between the LCom-enabled luminaire 100 and its backdrop may be so stark that the auto-exposure setting of front-facing image capture device 252 may be quickly thrown off, introducing a varying noise floor. Thus, in accordance with some embodiments, the ambient light level detected by ambient light sensor 265 may be utilized to control the exposure setting of front-facing image capture device 252, thereby helping to minimize or otherwise reduce variations in the noise floor. It should be noted, however, that the present disclosure is not so limited, as in some embodiments, front-facing image capture device 252 may be configured to calibrate itself, in part or in whole, based on measured pixels.

In an example scenario, a user may enter an LCom-enabled location (e.g., such as a store or other site having LCom-enabled luminaires 100) looking for an item of interest. Once inside the LCom-enabled location, the user may initiate an indoor navigation application 216 on computing device 200 to guide him/her to the item of interest. When the indoor navigation application 216 opens, the front-facing image capture device 252 of computing device 200 may search within its FOV for an LCom signal from an overhead or otherwise nearby transmitting LCom-enabled luminaire 100. Upon detection of an LCom signal, the exact location in space of the source LCom-enabled luminaire 100 may be received by computing device 200 via that LCom signal. Computing device 200 then may calculate its present position, for example, using: (1) the location information received via the LCom signal transmitted by the source LCom-enabled luminaire 100; and/or (2) information provided by one or more sensors 260 hosted by computing device 200 (e.g., such as tilt information provided by a gyroscopic sensor 267 of computing device 200). Once the initial navigation location is calculated, computing device 200 may switch to monitoring LCom signals with ambient light sensor 265 to gather additional information, such as promotional specials, calibration data, and/or any other data. Meanwhile, front-facing image capture device 252 may continue to monitor nearby LCom-enabled luminaires 100 to aid in decoding received LCom signals and/or detecting a change in the situation. At this point, computing device 200 may have successfully collected all the information from a given nearby LCom-luminaire 100, and a navigation application 216 of computing device 200 may be ready to guide the user onward. As the user moves within the LCom-enabled location, ambient light sensor 265 may continuously monitor LCom signals and look for changes in transmission patterns, which would indicate that computing device 200 has moved beneath or otherwise near a different transmitting LCom-enabled luminaire 100. When a change is detected, front-facing image capture device 252 may come back online, establish a new orientation of the LCom-enabled luminaires 100 within its FOV, and let ambient light sensor 265 know when to proceed with detecting available LCom signals. Meanwhile, front-facing image capture device 252 may reliably detect any slower, basic LCom data available. This switching between front-facing image capture device 252 and ambient light sensor 265 may continue throughout the user's indoor navigation experience to achieve reliable, high-speed LCom data interpretation from the on-site LCom-enabled luminaires 100, in accordance with some embodiments.

In another example scenario, front-facing image capture device 252 and ambient light sensor 265 may be used simultaneously (e.g., rather than switching between the two). Here, front-facing image capture device 252 may determine which transmitting LCom-enabled luminaire 100 is the source of the light output, and ambient light sensor 265 may detect any available high-frequency LCom signals. This may allow for a coarse orientation to be computed by computing device 200 to orient the user relative to a given transmitting LCom-enabled luminaire 100. For instance, front-facing image capture device 252 may estimate that a transmitting LCom-enabled luminaire 100 is some distance ahead of computing device 200, while ambient light sensor 265 may detect an LCom signal that the source LCom-enabled luminaire 100 is at a certain set of coordinates in space. Using such data, the location of computing device 200 (and thus the user, if present) can be determined, in accordance with some embodiments.

It should be noted, however, that any of the example contexts, scenarios, and uses discussed herein with respect to utilizing a front-facing image capture device 252 only or otherwise in preference over an ambient light sensor 265 are not so limited, as in accordance with some other embodiments, a combination of front-facing image capture device 252 and ambient light sensor 265 can be utilized in any given such context, scenario, or use, as desired for a given target application or end-use. Similarly, any of the example contexts, scenarios, and uses discussed herein with respect to utilizing an ambient light sensor 265 only or otherwise in preference over a front-facing image capture device 252 are not so limited, as in accordance with some other embodiments, a combination of ambient light sensor 265 and front-facing image capture device 252 can be utilized in any given such context, scenario, or use, as desired for a given target application or end-use. Likewise, any of the example contexts, scenarios, and uses discussed herein with respect to utilizing a combination of ambient light sensor 265 and front-facing image capture device 252 are not so limited, as in accordance with some other embodiments, front-facing image capture device 252 or ambient light sensor 265 can be utilized exclusively or otherwise in preference in any given such context, scenario, or use, as desired for a given target application or end-use. Numerous configurations and applications of the techniques disclosed herein will be apparent in light of this disclosure.

In some cases, use of techniques disclosed herein may realize benefits derived, for example, from efficacious use of various advantages provided by a front-facing image capture device 252 and/or various advantages provided by an ambient light sensor 265 of a host computing device 200. In some cases, use of the disclosed techniques may provide for reliable LCom linking and/or LCom data transfer rates between a given transmitting LCom-enabled luminaire 100 and a given receiving computing device 200. Some embodiments may provide for reliable and accurate LCom data transfer that is useful, for instance, to indoor navigation and/or other navigation and positioning contexts. Some embodiments may utilize componentry that is native to or otherwise already present on a computing device 200, such as a smartphone or other mobile computing device.

Techniques for Raster Line Alignment in LCom

Existing approaches for using a camera to decode pulsed light in light-based communication involve making assumptions about geometry and rely on having the receiving camera positioned directly under or directly in front of the pulsing light source. Furthermore, with these existing approaches, pulsing speeds are severely limited so that light transitions can be detected by a large number of raster lines of the receiving camera to keep the signal-to-noise ratio (SNR) sufficiently low. This is because the receiving camera does not know the pixel spacing between light sources and therefore the delay between light signals, and therefore worst-case scenarios are assumed.

As discussed herein, a given LCom-enabled luminaire 100 can be configured to transmit information about its absolute position, and that information can be utilized by a computing device 200 to determine its location based on its proximity to the transmitting LCom-enabled luminaire 100, in accordance with some embodiments. Thus, the information transmitted by a given LCom-enabled luminaire 100 can be utilized, in accordance with some embodiments, to provide for indoor navigation which exhibits improved accuracy, for example, as compared to existing GPS-based and WPS-based navigation techniques. However, as will be appreciated in light of this disclosure, successful indoor navigation using LCom may depend, at least in part, on proper alignment of the image sensor of a given image capture device 250 of computing device 200 relative to a given transmitting LCom-enabled luminaire 100 involved in the indoor navigation process.

Thus, and in accordance with some embodiments, techniques are disclosed for providing proper raster line alignment of a given image capture device 250 (e.g., front-facing image capture device 252; rear-facing image capture device 254) relative to a transmitting LCom-enabled luminaire 100 to establish reliable LCom there between. As discussed herein, in some cases, proper alignment can be provided automatically (e.g., by computing device 200 and/or other suitable controller). In some cases, proper alignment can be provided by the user. In some instances in which a user is to be involved in the alignment process, computing device 200 may be configured to instruct or otherwise guide the user in the process of properly aligning it relative to a given transmitting LCom-enabled luminaire 100. In some cases, the raster line alignment techniques disclosed herein can be utilized, for example, to realize improvements in successful LCom signal transmission, baud rate, SNR, overall system performance, and/or error rate. In accordance with some embodiments, the raster line alignment techniques disclosed herein can be utilized, for example, in scenarios in which a computing device 200 detects that a signal carrier (e.g., an LCom signal) is present, but that device 200 receives no or only partial LCom data and thus cannot decode the LCom data of the detected signal. In some cases, the disclosed raster line alignment techniques can be utilized, for example, in scenarios in which LCom is established between a computing device 200 and an LCom-enabled luminaire 100 but there is insufficient LCom data throughput (e.g., for internet browsing, video streaming, or other application involving high LCom data throughput).

Figure 9A:
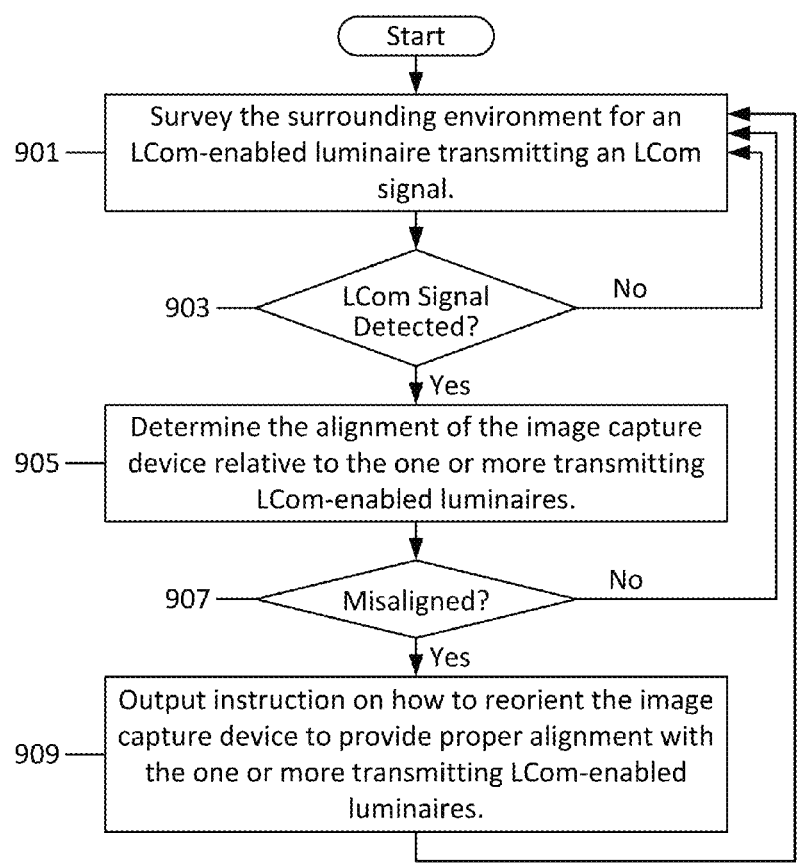
FIG. 9A is a flow diagram illustrating a method of providing instruction to achieve proper alignment of an image capture device relative to a transmitting LCom-enabled luminaire, in accordance with an embodiment of the present disclosure.

FIG. 9A is a flow diagram illustrating a method of providing instruction to achieve proper alignment of an image capture device 250 relative to a transmitting LCom-enabled luminaire 100, in accordance with an embodiment of the present disclosure. As can be seen, the flow may begin as in block 901 with surveying the surrounding environment for an LCom-enabled luminaire 100 transmitting an LCom signal. To that end, any of front-facing image capture device 252, rear-facing image capture device 254, and/or ambient light sensor 265 may be utilized. In some cases, a given image capture device 250 may perform a rolling shutter image capture to facilitate detection of LCom light pulses and thus determine which LCom-enabled luminaires 100 (if any) within its FOV are actively transmitting LCom signals. In performing a rolling shutter image capture, the image sensor of image capture device 250 may scan sequential raster lines (e.g., sequential rows of pixels) with pauses between the raster lines so that the previous raster line is collected right before the timing of the next image frame (e.g., the complete collection of rows and columns of pixels). Thus, consider the example case in which there are 100 raster lines in the image frame. If image capture device 250 is operating at a frame rate of 30 FPS, then each image frame is 1/30 seconds (about 0.033 s) long, and the time delay between gathering raster lines is about 0.033 s/100 raster lines (about 0.00033 s/raster line). By using a rolling shutter image capture, any light transients may be collected because, at any specified time, some pixel of image capture device 250 is collecting light. As will be appreciated in light of this disclosure, the timing of the event may be dictated by which raster line detects the light transition(s). Thus, assuming the example conditions noted above, if the light output of a given LCom-enabled luminaire 100 pulses at 300 Hz, then every 10 raster lines of the image capture device 250 of computing device 200 would detect a transition.

Thereafter, the flow may continue as in block 903. If no LCom signal is detected by computing device 200, then the flow may return to block 901, and surveying of the surrounding environment may be performed again, if desired. If instead an LCom signal is detected by computing device 200, then the flow may continue as in block 905 with determining the alignment of the image capture device 250 relative to the one or more transmitting LCom-enabled luminaires 100 within the FOV (hereinafter referred to as the one or more LCom-enabled luminaires 100 of interest).

In making a raster line alignment determination, several parameters may be calculated or otherwise determined by computing device 200 (e.g., by the one or more processors 220 thereof). First, the position of a given LCom-enabled luminaire 100 of interest within the FOV of the image capture device 250 of computing device 200 may be determined. To this end, it may be desirable to ensure that the LCom-enabled luminaire 100 is fully within the FOV of the image capture device 250 (e.g., front-facing image capture device 252; rear-facing image capture device 254) so as to fully qualify that LCom-enabled luminaire 100 as a valid source of LCom data. In some cases, this may help to minimize or otherwise reduce susceptibility of computing device 200 to detecting false sources of LCom signals, such as reflection of a distant LCom-enabled luminaire 100, which might otherwise yield a false determination of location. In some instances, the contrast in brightness of a given LCom-enabled luminaire 100 of interest as compared to its surroundings (e.g., ceiling, wall, mounting surface, etc.) may facilitate identification of a clear outline of the LCom-enabled luminaire 100 for purposes of determining its location.

Second, the geometry of the one or more LCom-enabled luminaires 100 of interest may be determined. To that end, the longest dimension (L) of a given LCom-enabled luminaire 100 may be determined. In some cases, the longest dimension (L) may be readily identified, for example, by observing the shape of the LCom-enabled luminaire 100 of interest. To detect the geometry of the one or more LCom-enabled luminaires 100 of interest, a given image capture device 250 may perform a normal shutter image capture (e.g., switching from a rolling shutter image capture mode, as utilized in surveying, discussed above), as this will leave the image sensor of the image capture device 250 active for a period of time that is much longer than the pulsing of the light (thus temporarily ignoring the pulsing of the light), thereby creating a clear image of the orientation of the one or more LCom-enabled luminaires 100 of interest.

Third, if a paired arrangement of LCom-enabled luminaires 100 of interest is observed, then the orientation of its constituent LCom-enabled luminaires 100 may be determined. To that end, the two LCom-enable luminaires 100 of the paired arrangement may pulse slowly at the start of their LCom sequence so that even a misaligned raster field of a given image capture device 250 can detect the orientation of the two LCom-enable luminaires 100. In some cases, the orientation information determined here may be supplemented with additional information about the paired arrangement of LCom-enabled luminaires 100, such as the fact that the two constituent LCom-enabled luminaires 100 are arranged, for example, in parallel or in serial according to their longer dimension (L).

Fourth, the raster direction of the image capture device 250 may be determined. The raster direction may be a constant hardware parameter inherently designated by the particular configuration of the image capture device 250 (e.g., front-facing image capture device 252; rear-facing image capture device 254) of computing device 200. In some other cases, however, the raster direction may be adjustable, for example, in terms of how the image capture device 250 addresses the pixels in frame and/or how the image capture device 250 rotates itself within or otherwise with respect to the host computing device 200.

Figure 9B:
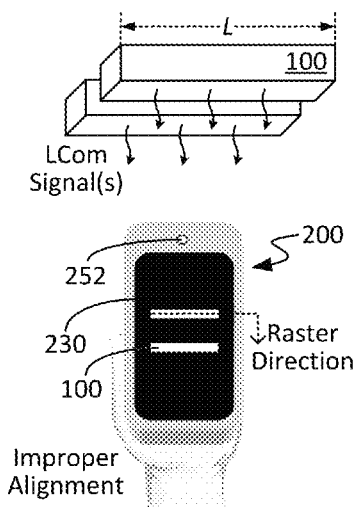
FIG. 9B illustrates an example scenario of improper alignment between the raster direction of a front-facing image capture device of a computing device and a dual arrangement of paired transmitting LCom-enabled luminaires, in accordance with an embodiment of the present disclosure.
Figure 9C:
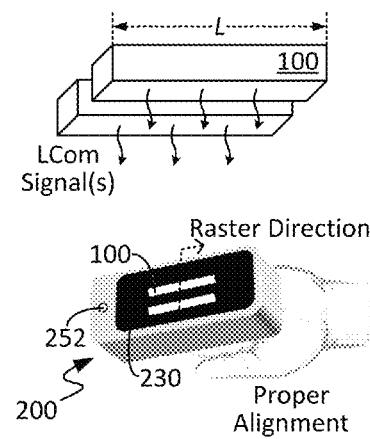
FIG. 9C illustrates an example scenario of proper alignment between the raster direction of a front-facing image capture device of a computing device and a dual arrangement of paired transmitting LCom-enabled luminaires, in accordance with an embodiment of the present disclosure.

After determination of the position, geometry, and orientation of the one or more LCom-enabled luminaires 100 of interest, the raster direction of image capture device 250 (e.g., front-facing image capture device 252; rear-facing image capture device 254) may be compared against that information to accurately determine the alignment of the image capture device 250 relative to the one or more LCom-enabled luminaires 100 of interest. FIG. 9B illustrates an example scenario of improper alignment between the raster direction of a front-facing image capture device 252 of a computing device 200 and a dual arrangement of paired transmitting LCom-enabled luminaires 100, in accordance with an embodiment of the present disclosure. Here, the two LCom-enabled luminaires 100 of interest are arranged substantially parallel to one another, and the raster line of front-facing image capture device 252 detects only one constituent LCom-enabled luminaire 100 at a time, resulting in faulty transition data. Contrariwise, FIG. 9C illustrates an example scenario of proper alignment between the raster direction of front-facing image capture device 252 of a computing device 200 and a dual arrangement of paired transmitting LCom-enabled luminaires 100, in accordance with an embodiment of the present disclosure. Here, the raster line of front-facing image capture device 252 detects both constituent LCom-enabled luminaires 100 at the same time, resulting in valid transition data.

In accordance with some embodiments, determination of the alignment between an image capture device 250 and a given transmitting LCom-enabled luminaire 100 may involve measuring the quality of the detected LCom signal. To that end, it may be desirable in some cases to ensure that the captured image of the one or more transmitting LCom-enabled luminaires 100 encompasses the entire LCom data packet within a single CMOS image frame of image capture device 250. In some instances, the optimality (or other quality metric) of a detected LCom signal may depend on a number of factors, such as, for example: (1) the quantity of raster lines or total number of coherent pixels that correspond to a unique transmitting LCom-enabled luminaire 100; (2) the fixed scan time per raster line of image capture device 250; (3) the fixed packet length of LCom data transmitted by a transmitting LCom-enabled luminaire 100; and/or (4) the orientation of a given image capture device 250 of computing device 200 (e.g., which may depend, in part or in whole, on the position of the host user or other host platform). As will be further appreciated, in some cases the scan time and packet length may be generally fixed parameters, whereas the quantity of raster lines or total number of coherent pixels may be a measured quantity, and the orientation of image capture device 250 may be user-configurable or otherwise variable, as desired for a given target application or end-use.

Thereafter, the flow may continue as in block 907 with determining whether there is misalignment (e.g., as compared to an optimal or other target alignment) between the image capture device 250 and a given transmitting LCom-enabled luminaire 100. In accordance with some embodiments, such a determination may involve computation of an optimal or other desired position and/or orientation of that image capture device 250. To that end, the longest dimension (L) of the transmitting LCom-enabled luminaire 100 geometry may be substantially aligned (e.g., precisely aligned or otherwise within a given tolerance) with the direction of the raster scan of the image capture device 250 of computing device 200. In some cases, the raster line may be substantially perpendicular (e.g., exactly perpendicular or otherwise within a given tolerance) to the longest dimension (L) of the transmitting LCom-enabled luminaire 100. In accordance with some embodiments, the quantity of coherent pixels per transmitting LCom-enabled luminaire 100 may be counted continuously. Thus, if computing device 200 is moved around and this count increases, then that may signify that the LCom signal strength has improved. If instead the count decreases, then that may signify that the LCom signal strength has weakened, and it may be desirable to return the image capture device 250 to its previous position and/or orientation in order to improve the LCom signal strength (e.g., by maximizing the quantity of coherent pixels counted by computing device 200). As will be appreciated in light of this disclosure, for a given known LCom-enabled luminaire 100 geometry, if an obstruction is blocking the image sensor of image capture device 250, then it may be desirable to move that image capture device 250 (or otherwise move computing device 200) so that the entire transmitting LCom-enabled luminaire 100 is detected (e.g., in the direction of the raster scan). As will be further appreciated, in some cases it may be desirable to optimize positioning, for example, in scenarios where data streaming (e.g., high LCom data throughput) is desired.

If the image capture device 250 is not misaligned with respect to the one or more LCom-enabled luminaires 100 of interest, then the flow may return to block 901, and surveying of the surrounding environment may be performed again, if desired. If instead the image capture device 250 is determined to be misaligned relative to the one or more LCom-enabled luminaires 100 of interest, then the flow may continue as in block 909 with outputting instruction on how to reorient the image capture device 250 to provide proper alignment with the one or more LCom-enabled luminaires 100 of interest. In some cases, the instruction may be by way of one or more control signals (e.g., from a processor 220; from a controller 270) that cause computing device 200 to automatically reorient (e.g., move, rotate, or otherwise reposition) itself and/or its image capture device(s) 250 so that: (1) the one or more LCom-enabled luminaires 100 of interest are centered or otherwise properly within the FOV of the image capture device 250; and/or (2) the raster lines of the image capture device 250 are properly aligned with the one or more LCom-enabled luminaires 100 of interest. In some other cases, the instruction may be by way of one or more control signals (e.g., from a processor 220; from a controller 270) that cause computing device 200 to automatically adjust the raster setup of the image sensor of a given image capture device 250, for instance, in terms of how it addresses the pixels in frame and/or how the image capture device 250 rotates itself within or otherwise with respect to the host computing device 200.

Figure 9D:
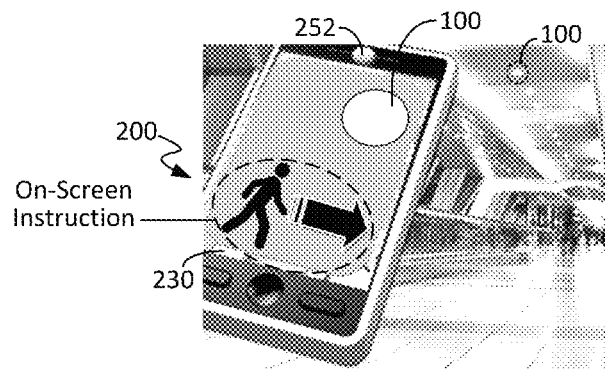
FIG. 9D illustrates an example scenario in which a computing device is configured to output instruction by way of visual feedback to a user, in accordance with an embodiment of the present disclosure.

In some still other cases, the instruction may be by way of an on-screen instruction or other guidance cue from computing device 200 intended to guide the user on how to manually reorient (e.g., move, rotate, or otherwise reposition) it and/or its image capture device(s) 250 so that: (1) the one or more LCom-enabled luminaires 100 of interest are centered or otherwise properly within the FOV of image capture device 250; and/or (2) the raster lines of the image capture device 250 are properly aligned with the one or more LCom-enabled luminaires 100 of interest. To that end, computing device 200 may provide the user with visual feedback via display 230 (e.g., via a GUI presented thereat). For example, consider FIG. 9D, which illustrates an example scenario in which computing device 200 is configured to output instruction by way of visual feedback to a user, in accordance with an embodiment of the present disclosure. As can be seen here, in this example case, the GUI presented at display 230 of computing device 200 shows that the front-facing image capture device 252 of computing device 200 is not properly aligned with respect to an LCom-enabled luminaire 100 of interest. The GUI presented at display 230 also provides on-screen feedback that signifies that the user should move forward with the computing device 200 toward the LCom-enabled luminaire 100 of interest to provide for proper alignment between front-facing image capture device 252 and that LCom-enabled luminaire 100. In another example case, if computing device 200 determines that the one or more LCom-enabled luminaires 100 of interest are oriented parallel to the raster lines of a given image capture device 250, then it may instruct/guide the user to rotate the image capture device 250 by 90° to provide proper alignment (e.g., before continuing with indoor navigation). In some embodiments, computing device 200 may be configured to provide a visual aid (e.g., aligning crosshairs; matching rectangles; aligning a target image or silhouette; directional arrows, for instance, in case computing device 200 is in motion, such as when the user is walking) which assists the user in aligning the LCom-enabled luminaire 100 with the direction of the raster scan of a given image capture device 250 of computing device 200. It should be noted, however, that the present disclosure is not so limited only to instruction by way of visual feedback, as in accordance with some other embodiments, audio (e.g., sound emitted via audio output device 280), haptic (e.g., vibration emitted by an actuator, such as a vibratory motor), and/or any other suitable type of feedback may be provided to a user, as desired for a given target application or end-use. In an example case, aural feedback may be provided as a beeping sound that increases in frequency as a target orientation is approached, followed by a constant tone when the target alignment is achieved. In another example case, a voice may provide verbal commands that can be followed by a user in reorienting to achieve a target alignment. In some embodiments, audio feedback may be provided to a user to suggest a best or otherwise desirable position for optimal LCom signal strength based, for example, on at least one of position and/or orientation. Other suitable feedback types will depend on a given application and will be apparent in light of this disclosure.

In the case of a single LCom-enabled luminaire 100 of interest pulsing its light output, it may be desirable to ensure that the raster lines of a given image capture device 250 (e.g., front-facing image capture device 252; rear-facing image capture device 254) are substantially parallel (e.g., precisely parallel or otherwise within a given tolerance) to the longest dimension (L) of that LCom-enabled luminaire 100. In some instances, this type of alignment may help to isolate transient effects and/or improve SNR by allowing the active raster line to detect more of the pulsing light at one time, as opposed to merely detecting a small cross-section. Otherwise, if the raster line of the image capture device 250 is misaligned relative to the transmitting LCom-enabled luminaire 100, then the portion of the light detected by the raster line may be very small and thus have a much higher noise level, negatively impacting the SNR. To this end, computing device 200 may automatically reorient image capture device 250 and/or provide on-screen instruction or other guidance to a user on how to reorient it so that the raster lines properly align with the single LCom-enabled luminaire 100, for example, in order to capture the longest dimension (L) of the LCom-enabled luminaire 100 for optimal (or other desired) SNR, in accordance with some embodiments.

In the case of a dual arrangement of LCom-enabled luminaires 100 of interest communicating as a pair by pulsing their light output, for instance, in opposite polarities (e.g., one LCom-enabled luminaire 100 is actively emitting and the other LCom-enabled luminaire 100 shuts off to keep the ambient light level constant and be less noticeable to nearby observers during the LCom sequence), it may be desirable to ensure that both of the constituent LCom-enabled luminaires 100 are detected by the same raster line of a given image capture device 250 (e.g., front-facing image capture device 252; rear-facing image capture device 254) of computing device 200 (e.g., as in FIG. 9B). Otherwise, a raster line may detect a transition of one constituent LCom-enabled luminaire 100, but not detect the transition in the other constituent LCom-enabled luminaire 100 until some unknown time later (e.g., as in FIG. 9A). This may result in LCom break down because it is nearly impossible to analyze transitions given that the delay time in detection between the two constituent LCom-enabled luminaires 100 of the dual paired arrangement depends on parameters unknown to computing device 200. To this end, computing device 200 may automatically reorient image capture device 250 and/or provide on-screen instruction or other guidance to a user on how to reorient it so that a given raster line properly aligns with the two constituent LCom-enabled luminaires 100, in accordance with some embodiments.

It should be noted that the alignment techniques disclosed herein need not be utilized continuously, and instead may be reserved, for example, for use in certain particular conditions and contexts that may arise during a given indoor navigation session. For instance, the proper alignment techniques disclosed herein may be utilized, in accordance with some embodiments, when reading an initial LCom-enabled luminaire 100 to initiate an indoor navigation session. In accordance with some embodiments, the proper alignment techniques disclosed herein may be utilized when an LCom signal needs refinement, such as in cases in which multiple LCom-enabled luminaires 100 are sufficiently close to a target where refinement of position is desired. If for some reason it is not particularly convenient to reorient computing device 200 with respect to a given LCom-enabled luminaire 100 of interest, then even just determining that the raster lines of a given image capture device 250 are misaligned with respect thereto can be used, for example, to modify the LCom (e.g., to perhaps a more stable but not fully accurate state).

In accordance with some other embodiments, the pulsing frequency of the light pulses emitted by a given LCom-enabled luminaire 100 may be reduced, for example, to a point where those pulses are not smaller in terms of the pixels of image capture device 250 than the separation between the paired LCom-enabled luminaires 100. For instance, consider the example case in which an image capture device 250 is configured to detect 1,000 pixels×1,000 pixels. If two paired LCom-enabled luminaires 100 occupy half of the screen, then the separation between them is 500 pixels. Applying the double frequency principle, it follows that transitions may not happen any less than 1,000 pixels. As such, transmission is limited to 15 Hz for an image capture device 250 having a frame rate, for example, of 30 FPS. Under such conditions, approximately 2 bytes of LCom data may be transmitted per second. Thus, a transmission, for example, of longitude, latitude, altitude, ID, and perhaps some other piece of information would take several seconds, during which time the user would stand idly near the paired LCom-enabled luminaires 100 collecting the LCom data. However, this may not guarantee an alignment of the raster line of image capture device 250 relative to a given LCom-enabled luminaire 100. If instead the raster line of image capture device 250 were properly aligned with an LCom-enabled luminaire 100, then transmission speeds could be greatly increased (e.g., about 50× faster assuming 10 pixels to declare a good transition), and an LCom transmission of 10 bytes of LCom data would take only a fraction of a second, in accordance with an example embodiment.

Some embodiments may avoid or otherwise reduce limitations on pulsing speeds that may be imposed by typical SNR considerations in light-based communication. As a result, in some cases, the faster pulsing speeds may reduce the total time window needed for transmission of a given LCom signal, thus reducing the amount of time that a user must wait near a transmitting LCom-enabled luminaire 100 to ensure successful receipt of any LCom data transmitted thereby. Some embodiments may realize improvements in reliable detection and decoding of LCom signals transmitted by single LCom-enabled luminaires 100 and/or by paired arrangements LCom-enabled luminaires 100. In some cases, use of the disclosed techniques may reduce susceptibility of a computing device 200 to detecting false sources of LCom signals, such as reflections, and thus improve the ability to provide accurate and reliable positioning information (e.g., for indoor navigation). In some cases, techniques disclosed herein can be used, for example, to compensate for unknown geometries which otherwise would be required for addressing misalignment between the raster line of an image capture device 250 and an LCom-enabled luminaire 100 of interest.

Techniques for Determining an LCom Receiver Position

Figure 10A:
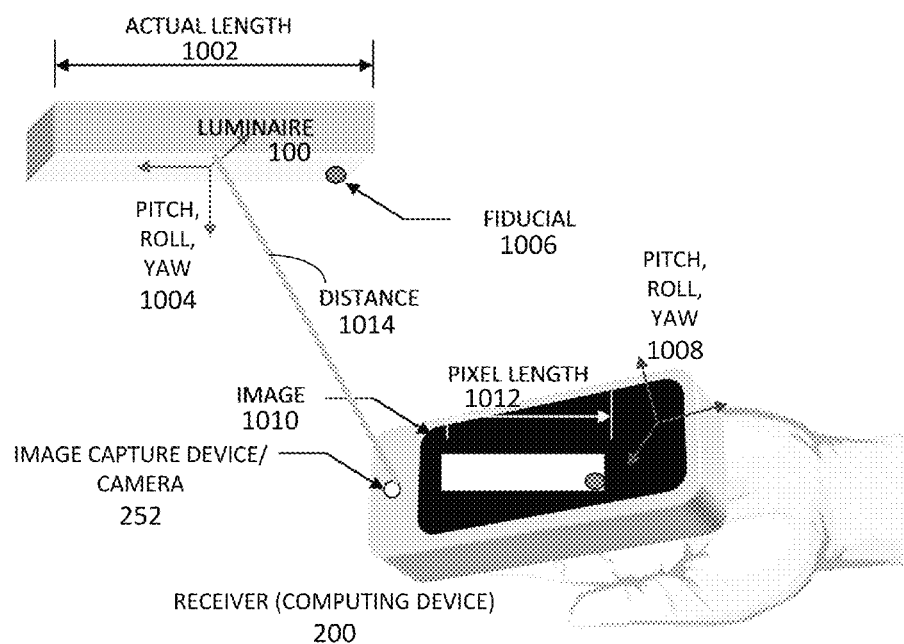
FIG. 10A illustrates an example LCom system, including an LCom-enabled luminaire and an LCom receiver, in accordance with an embodiment of the present disclosure.

FIG. 10A illustrates an example LCom system, including LCom-enabled luminaire 100 and LCom receiver 200, in accordance with an embodiment of the present disclosure. In the example system, the LCom receiver 200 is a smart phone; however, LCom receiver 200 may be any computing device as variously described herein. In this embodiment, the receiver 200 includes an image capture device 252, which in this example system is a camera (and more specifically a front-facing camera). Note that the camera/image capture device may be integrated with the receiver, such as is the case with receiver 200, or the camera/image capture device may be external to the receiver and communicatively coupled (e.g., in a wired or wireless manner). In addition, luminaire 100 may be any LCom-enabled luminaire as variously described herein.

Figure 10B:
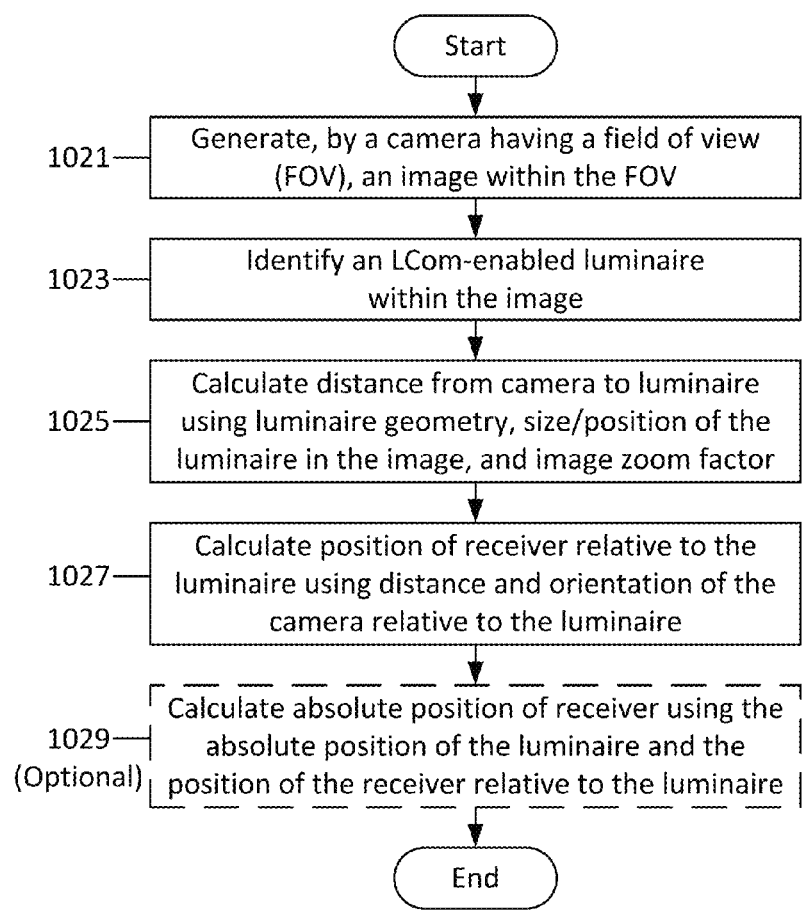
FIG. 10B illustrates an example method of determining an LCom receiver position, in accordance with an embodiment of the present disclosure.

FIG. 10B illustrates an example method of determining an LCom receiver position, in accordance with an embodiment of the present disclosure. For ease of description, the example LCom system illustrated in FIG. 10A will be used to describe the method of FIG. 10B. However, any suitable LCom system may be used to implement the methodology, as will be apparent in light of this disclosure. The example method includes generating 1021, by a camera 252 having a field of view (FOV), an image within the FOV. In some embodiments, the method may instead or also include receiving the image from the camera 252. The method also includes identifying 1023 an LCom-enabled luminaire within the image 1010. As shown in FIG. 10A, image 1010 is displayed on a display of receiver 200 and image 1010 includes luminaire 100 having a pixel length 1012. In some embodiments, luminaire 100 is identified 1023 using an LCom signal transmitted from luminaire 100. Additional or alternative data may be transmitted by luminaire 100 via an LCom signal, as will be described herein; however, if receiver 200 has at least an identification (ID) of luminaire 100, then additional information can be obtained in another suitable manner using that ID, such as via a lookup table, for example.

The method of FIG. 10B continues with calculating 1025 the distance 1014 from receiver 200 to luminaire 100. Calculation 1025 may use geometry of luminaire 100, the size and/or position of luminaire 100 in image 1010, and the zoom factor of image 1010. The geometry of the luminaire may include, for example, the length 1002 of luminaire 100, the width of luminaire 100, the orientation of lights or panels within luminaire 100, and/or any other information about the geometry of luminaire 100. The geometry of luminaire 100 may be obtained via an LCom signal transmitted from luminaire 100 or in another suitable manner, such as via a lookup table using the ID of luminaire 100, for example. The size and/or position of luminaire 100 in image 1010 may be determined based on the pixel information representing luminaire 100, for example, or any other suitable manner. For example, the pixel length 1012 of luminaire 100 can be seen in image 1010, and pixel length 1012 can be compared to the actual luminaire length 1002 when calculating 1025 distance 1014. The zoom factor of image 1010 may be determined based on the specifications of the camera and/or the image generation method, such as the properties of the lens, for example, or any other suitable factors. Calculation 1025 may be performed using any other suitable technique, as will be apparent in light of this disclosure.

The method of FIG. 10B continues with calculating 1027 the position of receiver 200 relative to luminaire 100 using distance 1014 and the orientation of receiver 200 relative to luminaire 100. The position of receiver 200 relative to luminaire 100 may be expressed as a vector position, for example. The orientation of receiver 200 relative to luminaire 100 may be determined using fiducial 1006 or some other recognizable aspect of luminaire 100 as an orientation cue. For example, the location of fiducial 1006 can be seen in image 1010, which can be used to help orient receiver 200 relative to luminaire 100. Fiducials may include special markings on the luminaire, a non-symmetric luminaire design aspect, a unique geometry of the luminaire, or any other suitable aspect of the luminaire recognizable by the receiver. In some embodiments, the fiducial need not be directly on or a part of the luminaire (e.g., the fiducial may be adjacent to the luminaire). In any case, the fiducial may merely be associated with luminaire 100 and may be detectable within image 1010 generated by camera 252. In some embodiments, the fiducial may be a virtual fiducial created by the light output by luminaire 100 (e.g., as described herein with reference to a multiple panel luminaire). The orientation of receiver 200 relative to luminaire 100 may also be determined using the yaw, pitch, and roll 1004 of luminaire 100 and/or the yaw, pitch, and roll 1008 of receiver 200. The yaw, pitch, and roll 1004 of luminaire 100 may be obtained via an LCom signal transmitted from luminaire 100 or in another suitable manner, such as via a lookup table using the ID of luminaire 100, for example. The yaw, pitch, and roll 1008 of receiver 200 (e.g., relative to the ground or floor) may be determined using a gyroscope, such as an internal gyroscope, for example. In some embodiments, yaw, pitch, and roll 1004 and/or 1008 may be used to calculate 1025 distance 1014. The orientation of receiver 200 relative to luminaire 100 may also be determined using the heading of receiver 200. The heading (e.g., compass or absolute heading) of receiver 200 may be determined using a geomagnetic sensor, such as an internal geomagnetic sensor, for example. The orientation may also be determined using any other suitable technique, as will be apparent in light of this disclosure. Once the distance 1014 and orientation of receiver 200 relative to luminaire 100 are determined, the position of receiver 200 relative to luminaire 100 can be calculated using any suitable technique.

The method of FIG. 10B optionally continues with calculating 1029 the absolute position of receiver 200. Calculation 1029 may use the absolute position of luminaire 100 and the position of receiver 200 relative to luminaire 100 (determined in calculation 1027). The absolute position of luminaire 100 may be obtained via an LCom signal transmitted from luminaire 100 or in another suitable manner, such as via a lookup table using the ID of luminaire 100, for example. The techniques for emitting position information from an LCom-enabled luminaire as variously described herein may also be used to determine the absolute position of luminaire 100.

In an example case of the LCom system illustrated in FIG. 10A, luminaire 100 has a length of four feet by one foot. If it is determined that the size of luminaire in image 1010 takes up forty pixels by ten pixels, distance 1014 can then be calculated using the zoom factor of image 1010. Once distance 1014 is calculated 1025, the position of receiver 200 can be calculated 1027 to be anywhere on the surface of a sphere having a radius about equal to distance 1014, based on calculation 1025. Fiducial 1006 can then be used to orient receiver 200 relative to luminaire 100 and determine the vector position of receiver 200 relative to luminaire 100. The orientation determination may then be corrected by the pitch, roll, and yaw 1004 of luminaire 100 and/or by the pitch, roll, and yaw 1008 of receiver 200. The orientation determination may be further corrected using the heading of receiver 200. Optionally, the absolute position of receiver 200 can then be calculated 1029 using the absolute position of luminaire 100 and the position of receiver 200 relative to luminaire 100. Note that in some embodiments, receiver positioning may be performed using the absolute position and geometry information of a single luminaire in conjunction with the image of the luminaire (which can be used to resolve the observed geometry of the luminaire). In some such embodiments, the positioning technique may include computing the relative position of the smart device with respect to the luminaire, based on the geometry and geometrical reference point(s) of the luminaire. Further, in some such embodiments, inertial sensors (e.g., accelerometers and/or gyroscopic sensors) need not be present in, or utilized by, the receiver.

The techniques for determining an LCom receiver position shown in FIGS. 10A and 10B and described herein are provided in the context of having a single LCom-enabled luminaire within the FOV of the receiver for ease of description. However, the techniques can be used to determine an LCom receiver position when any number of LCom-enabled luminaires are within the FOV of the receiver. In some instances, when there are multiple LCom-enabled luminaires within the FOV of the receiver, the position of the receiver may be determined with greater accuracy/precision, because the receiver will have more than one point of reference for calculating its relative position, for example. Similarly, the accuracy/precision of the relative position of the receiver may also be improved when an LCom-enabled luminaire within the FOV of the receiver is transmitting more than one LCom signal, such as in the case of a multiple panel LCom-enabled luminaire, as variously described herein. Also note that although the techniques for determining an LCom receiver position are primarily discussed herein with reference to determining the distance, orientation, position, etc. of the receiver itself, in some embodiments, the distance, orientation, position, etc. of the receiver camera may also or alternatively be determined.

An example alternative to the techniques for determining an LCom receiver position described herein includes assuming that the LCom receiver is directly under a luminaire from which it is receiving LCom signals. For small, low hanging luminaires, where the distance from the luminaire to the receiver is a low amount (e.g., a meter or less), the resulting accuracy may be satisfactory. However, in some cases, luminaires may be mounted on high ceilings, such as in a large retail establishment. In such cases, the position of the LCom receiver position may be off by a significant amount, such as greater than 1 meter from directly under the luminaire, or some other amount depending on the target application. Therefore, the techniques variously described herein can be used to increase the accuracy of the determined LCom receiver position compared to, for example, assuming that the LCom receiver is directly under a luminaire from which it is receiving LCom signals. Additional benefits of the techniques as variously described can include the ability to lead a customer to a specific product on a shelf, increased accuracy compared to other positioning systems (e.g., GPS, WPS, etc.), providing a secure positioning system that can be set up to operate independently from other communication networks (e.g., a wide area network (WAN), such as the Internet), and other benefits as will be apparent in light of the present disclosure.

Augmenting LCom Receiver Positioning

Figure 11A:
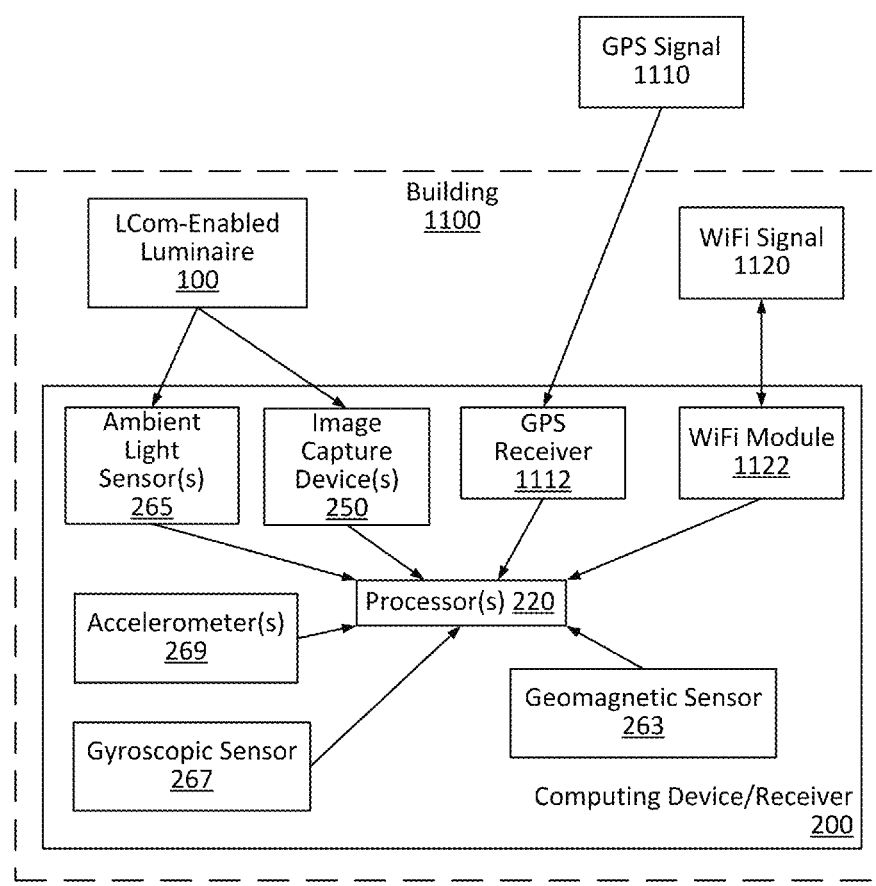
FIG. 11A illustrates an example LCom system, including an LCom-enabled luminaire and an LCom receiver, in accordance with an embodiment of the present disclosure.

FIG. 11A illustrates an example LCom system, including LCom-enabled luminaire 100 and LCom receiver 200, in accordance with an embodiment of the present disclosure. In this example system, receiver 200 includes ambient light sensor 265, image capture device(s) 250, accelerometer(s) 269, gyroscopic sensor 267, geomagnetic sensor 263, GPS receiver, 1112, and Wi-Fi module 1122 all configured to provide input to processor(s) 220. Although receiver 200 need not have all of the componentry shown in FIG. 11A, and receiver 200 may have additional or alternative componentry as variously described herein, the specific configuration shown will be used herein for ease of description. As can also be seen in this example embodiment, ambient light sensor(s) 265 and image capture device(s) 250 are configured to receive LCom signals from one or more LCom-enabled luminaires 100, GPS receiver 1112 is configured to receive GPS signals 1110 (e.g., from a satellite), and Wi-Fi module 1122 is configured to receive/transmit Wi-Fi signals 1120 (e.g., from a Wi-Fi router). Accordingly, receiver 200 may be configured to determine position information using a light based positioning system (e.g., using LCom signals received from LCom-enabled luminaire 100), GPS, or WPS. In this example embodiment, receiver 200 and LCom-enabled luminaire are in building 1100 represented by the dotted line box. However, the dotted line box may also represent a vehicle, such as a bus, plane, ship, or train, for example. In addition, Wi-Fi signal 1120 is being transmitted/received from within building 1100, while GPS signal 1110 is being transmitted from outside of building 1100. The example configuration and layout in FIG. 11A is provided for illustrative purposes and is not intended to limit the present disclosure.

In some embodiments, receiver 200 may be configured to augment positioning techniques using an inertial navigation system (INS). The INS may utilize accelerometer(s) 269 and/or gyroscopic sensor 267 to calculate, via dead reckoning, the position, orientation, and velocity of the receiver. In this manner, receiver 200 can calculate its relative position using the INS based on a known starting/reference point or location. For example, the following equation may be used for the receiver INS:

$$\vec{s}(t) = \vec{s}_b + \int_{t_0}^{t} (\int_{t_0}^{t} \vec{a}(t)dt)dt$$

where $\vec{s}_b$ is the last valid position of receiver 200 and $\vec{a}(t)$ the absolute acceleration data computed using accelerometer(s) 269 and/or gyroscopic sensor 267. In some embodiments, receiver positioning may be augmented using the heading of receiver 200, which can be obtained from geomagnetic sensor 263, for example.

Figure 11B:
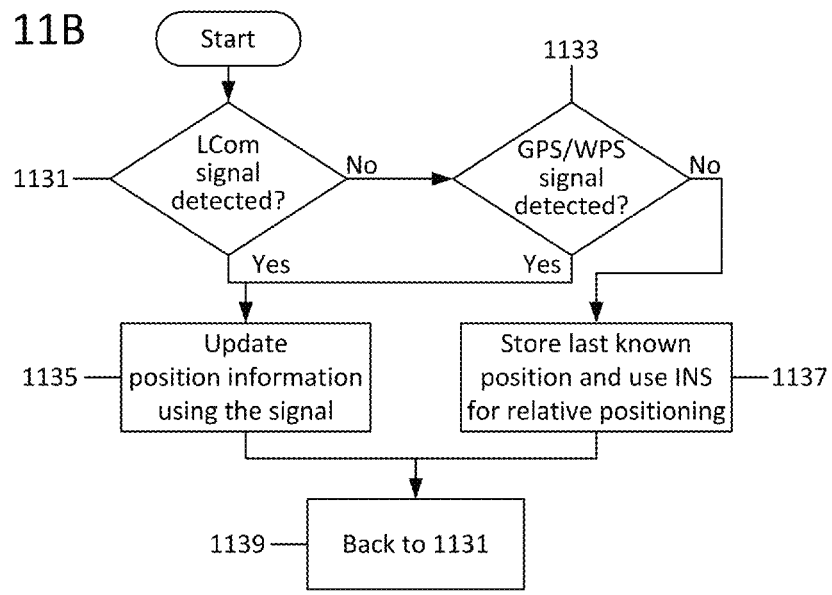
FIG. 11B illustrates an example method of augmenting LCom receiver positioning using an inertial navigation system (INS), in accordance with an embodiment of the present disclosure.

FIG. 11B illustrates an example method of augmenting LCom receiver positioning using an inertial navigation system (INS), in accordance with an embodiment of the present disclosure. For ease of description, the system of FIG. 11A will be used to describe the methodology. The method includes determining 1131 if an LCom signal is detected. Determination 1131 can be performed using any suitable technique, such as using ambient light sensor(s) 265 and/or image capture device(s) 250. If at 1131, no LCom signal is detected, then the method continues by determining 1133 if a GPS and/or WPS signal is detected. In some embodiments, determination 1133 may also include determining if any other positioning system signal is detected, depending upon the configuration of receiver 200. If at 1131, an LCom signal is detected, or at 1133, a GPS/WPS signal is detected, then the method continues by updating 1135 position information using the detected signal to determine the location of receiver 200. In some embodiments, the method primarily relies on determining receiver 200 positioning information using an LCom signal, such that whenever an LCom signal is available, it is used for receiver positioning. This may be the case because the LCom signal(s) may be used for the most accurate positioning technique compared to using, for example, GPS and/or WPS signals. In other embodiments, there may not be a preference. In some embodiments, the location of receiver 200 may dictate the positioning system used. For example, in some such embodiments, if receiver 200 knows it is outside, then GPS may be used as the default positioning system until receiver 200 knows it is inside. Further, in some embodiments, memory and/or power may be conserved by limiting or prioritizing positioning systems based on the environment of receiver 200, the last received positioning signal of receiver 200, or based on some other factor as will be apparent in light of this disclosure.

Continuing with the method of FIG. 11B, if no LCom signal is detected at 1131 and no GPS/WPS signal is detected at 1133, the method continues by storing 1137 the last known position or location of receiver 200 and using the INS to determine position information for receiver 200 relative to that last known position/location. In some cases, the last known position may be the last position updated at 1135. In any case, the last known position may be determined using the last known position of the receiver based on an LCom signal, a GPS signal, WPS signal, and/or any other suitable technique. In some embodiments, the receiver INS runs parallel to other positioning techniques to continuously calculate the relative position of receiver 200. In such cases, box 1137 of the method may be continually performed to, for example, increase receiver positioning accuracy. In other embodiments, the receiver INS may be activated after losing the communication link to other positioning systems (e.g., when no LCom, GPS, or WPS signals are detected). The method continues from boxes 1135 and 1137 by returning 1139 back to box 1131, to continue to determine whether an LCom signal (or GPS/WPS signal) is detected.

A benefit of augmenting position information or receiver positioning using an LCom receiver INS is that, despite not being able to retrieve position information from another positioning system, the receiver can still estimate its approximate location. The techniques may also be beneficial for estimating vertical positioning and/or height information, such as positioning within an elevator. For example, the INS may be used to estimate elevator floor position relative to the starting floor (the floor where the elevator was entered). Such an example may allow the receiver 200 to know when the desired floor position has been achieved and/or when to exit the elevator. Additional benefits will be apparent in light of the present disclosure.

LCom Transmission Protocol

Normally, in light-based communication, the transmitting source consumes the entire channel bandwidth and thus the receiver device can communicate with only one transmitting source at a given time. For multiple transmitting sources to communicate with the receiver device, there may be need to distinguish and select between the signals of those transmitting sources. Thus, in cases involving multiple transmitting sources and/or multiple receiver devices, it may be desirable to include an arbitration mechanism to avoid data packet collisions. Also, if a single light-based communication channel is broken in such a system, then it may be desirable for the transmitting source to have a redundant channel to which it can switch in order to successfully complete transmission.

Thus, and in accordance with some embodiments, techniques are disclosed for allocating LCom data to be transmitted over multiple colors of light output by multiple LCom-enabled luminaires 100 and transmitting that LCom data in parallel across the multiple colors of light using a time division multiple access (TDMA) scheme. In accordance with some embodiments, the disclosed techniques can be used, for example, to allow for multiple LCom-enabled luminaires 100 to communicate simultaneously with a single computing device 200 via LCom. In some cases, the disclosed techniques can be used, for example, to permit a greater quantity of LCom-enabled luminaires 100 to be disposed within a given space, thereby providing more accurate positioning, for instance, for indoor navigation. In some cases, the disclosed techniques may be used, for example, to provide a computing device 200 with the ability to filter multiple LCom signals received from different LCom-enabled luminaires 100. In some cases, the disclosed techniques can be used, for example, to allow multiple LCom channels to be active simultaneously in an LCom system 10.

Figure 12:
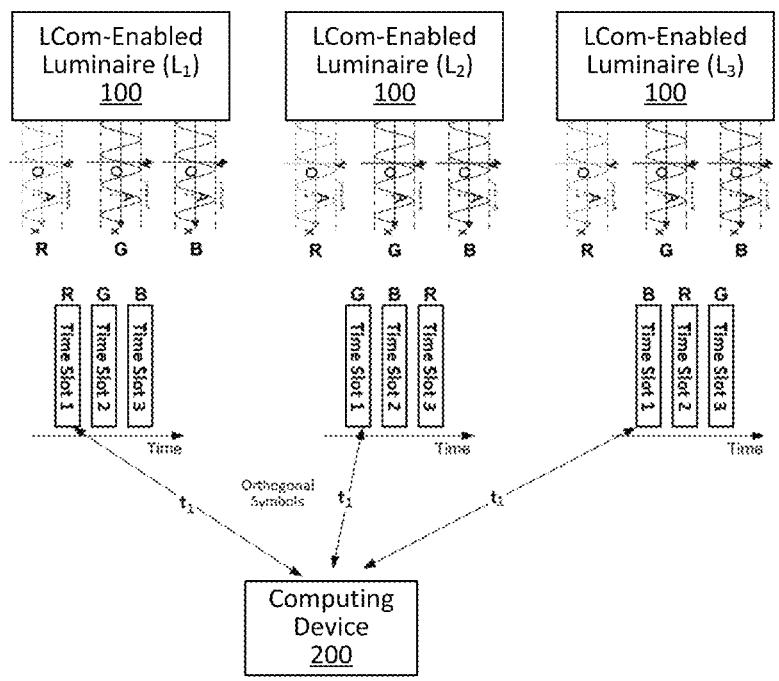
FIG. 12 illustrates an example arrangement of LCom-enabled luminaires configured to communicate via LCom with a computing device, in accordance with an embodiment of the present disclosure.

FIG. 12 illustrates an example arrangement of LCom-enabled luminaires 100 configured to communicate via LCom with a computing device 200, in accordance with an embodiment of the present disclosure. As can be seen here, there are three LCom-enabled luminaires 100 (labeled $L_1$, $L_2$, and $L_3$), each of which is configured, in accordance with an example embodiment, for RGB color-mixing of its light output. Also, as can be seen, the three LCom-enabled luminaires 100 ($L_1$-$L_3$) are spatially arranged and commissioned such that neighboring LCom-enabled luminaires 100 transmit over mutually exclusive (e.g., orthogonal) channels at a given instant. In other words, no neighboring LCom-enabled luminaires 100 communicate over the same LCom channel (e.g., over the same color of light output) at the same time, in accordance with an embodiment. As can be seen from the following table, for a given time period 'T,' where $T=t_1+t_2+t_3$, the three LCom-enabled luminaires 100 ($L_1$-$L_3$) transmit unique LCom data to computing device 200 in a simultaneous fashion:

| Luminaire | Emissions Color | | |
| --- | --- | --- | --- |
| | Red (R) | Green (G) | Blue (B) |
| $L_1$ | $L_1$(R) at $t_1$ | $L_1$(G) at $t_2$ | $L_1$(B) at $t_3$ |
| $L_2$ | $L_2$(R) at $t_3$ | $L_2$(G) at $t_1$ | $L_2$(B) at $t_2$ |
| $L_3$ | $L_3$(R) at $t_2$ | $L_3$(G) at $t_3$ | $L_3$(B) at $t_1$ |

The entries $L_1(R)$, $L_2(G)$, $L_3(B)$ at $t_1$ represent a unique LCom channel allocated over spatial and temporal domains. Here, TDMA permits sending independent LCom data packets in a sequential manner, in accordance with an embodiment. Once LCom is established between the LCom-enabled luminaires 100 and computing device 200, the LCom data packets may be transmitted by the source LCom-enabled luminaires 100 over various light channels (e.g., multiple colors of light emissions) in a round-robin fashion, in accordance with some embodiments.

In some cases, use of the techniques disclosed herein may provide for backup channels in case of LCom failure, leading to more reliable LCom data transmission. If a specific channel (e.g., a specific color) is subject to more ambient noise than the other channel(s) (e.g., one or more other colors), then transmission of LCom data in a round-robin manner may be utilized to ensure that all of the desired LCom data is sent via all available channels. If a single LCom channel is broken, then a given LCom-enabled luminaire 100 may switch to a redundant LCom channel (e.g., a different color). In some cases, use of the techniques disclosed herein may avoid or otherwise minimize LCom data packet collisions and/or channel crosstalk between participating LCom-enabled luminaires 100.

It should be noted that, while the disclosed techniques are generally discussed in the example context of an RGB color-mixing scheme, the present disclosure is not so limited. In a more general sense, and in accordance with some other embodiments, any color-mixing scheme with any quantity of constituent colors (e.g., RGBY, RGBW, dual-white, or any other suitable combination of emissions) may be used, as desired for a given target application or end-use. Given that the LCom channels are represented by the different wavelengths of light, the greater the quantity of colors of light output from participating LCom-enabled luminaires 100, the greater the quantity of available LCom channels, and thus the greater the amount of available bandwidth for LCom, as will be appreciated in light of this disclosure. In some cases in which multiple white light-emitting solid-state emitters (e.g., dual-white color scheme), and thus multiple white light-based LCom channels, are utilized, multiple source LCom-enabled luminaires 100 may be configured, for instance, such that only a given LCom channel communicates with the computing device 200 at a given time. As will be further appreciated in light of this disclosure, in some cases, the light output capabilities of a given LCom-enabled luminaire 100 may be selected, in part or in whole, based on a given tolerable amount of data packet collision control and/or crosstalk/interference.

Multiple Panel LCom-Enabled Luminaires

Figure 13A:
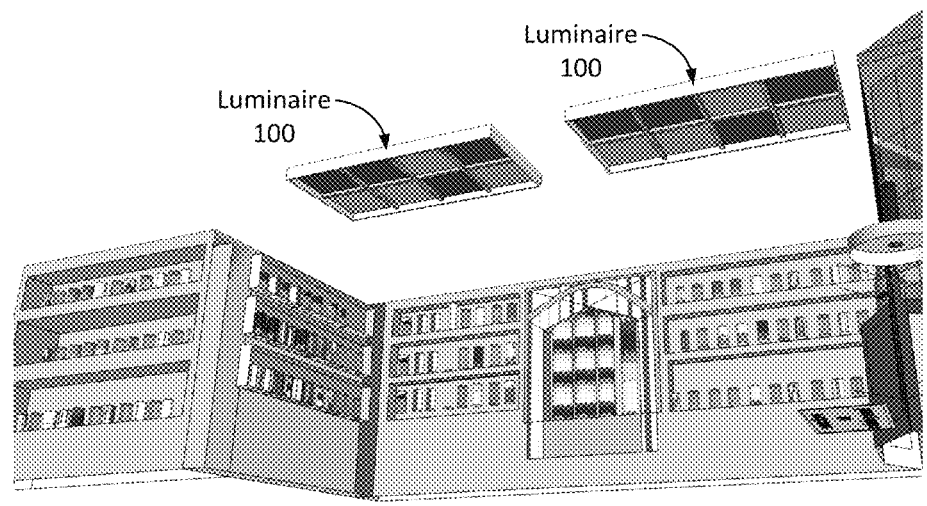
FIG. 13A illustrates a store including example multiple panel luminaires, in accordance with an embodiment of the present disclosure.
Figure 13B:
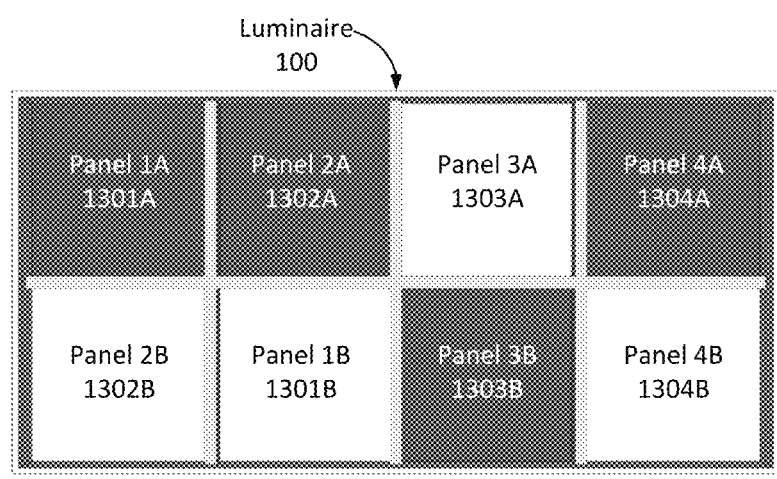
FIG. 13B illustrates a bottom view of an example multiple panel luminaire, in accordance with an embodiment of the present disclosure.

FIG. 13A illustrates a store including example multiple panel luminaires 100, in accordance with an embodiment of the present disclosure. FIG. 13B illustrates a bottom view of an example multiple panel luminaire 100, in accordance with an embodiment of the present disclosure. As can be seen in this example embodiment, luminaire 100 includes eight panels—1A (1301A), 1B (1301B), 2A (1302A), 2B (1302B), 3A (1303A), 3B (1303B), 4A (1304A), 4B (1304B). The panels will primarily be referred to by their panel number (e.g., 1A, 1B, etc.) for ease of description. The multiple panel luminaires described herein may have any suitable configuration. For example, the luminaires may be laid out in a rectangular grid having rows and columns, such as shown in FIG. 13B. In another example, the luminaires may be laid out in a circular arrangement. Therefore, the multiple panel luminaires are not limited to any particular design or configuration, unless otherwise indicated. Further, the panels of a multiple panel luminaire as variously described herein may be any discrete grouping of at least one solid-state light source. Therefore, the panels may have any shape and size, and are not limited to any particular design or configuration, unless otherwise indicated.

In the embodiment of FIG. 13B, each panel includes at least one solid-state light source and the light sources are configured to output light. Luminaire 100 may include any suitable componentry as will be apparent in light of this configuration, including at least one modulator 174 configured to modulate the light output of the light sources to allow for emission of LCom signals. In some embodiments, the panels may be modulated and/or driven independently, such that each panel is configured to emit its own LCom signal (and any emitted LCom signal may be attributable to a specific one of the panels). For ease of description, the techniques of controlling a multiple panel luminaire may be described herein assuming that at any given time, each LCom signal may be emitting either a high or a low (or a 1 or a 0) to transmit data, using any suitable technique as will be apparent in light of this disclosure. In some embodiments, a controller 150 of luminaire 100 may be configured to synchronize timing of the LCom signals emitted from the panels. In communication terms, the synchronization of the timing of the LCom signal emitted from the panels may be similar to parallel communication in a computer where each pin of a parallel cable can transmit information at the same time, but all signals are synchronized by one common clock.

In embodiments of multiple panel luminaires where the timing of LCom signals emitted from the panels is synchronized, a panel may be configured to emit an LCom signal that inverts or duplicates an LCom signal emitted by another panel. For example, if a first panel is configured to emit a first LCom signal and a second panel is configured to emit a second LCom signal, the second LCom signal may be an inverse or a duplicate of the first LCom signal. Using additional panels to invert or duplicate a signal can help with data integrity. For instance, inverting one panel from another one may allow data to still be effectively transmitted even if one of the two panels was blocked and/or noisy. Likewise, panels can be used as checksums or for smart bit correction using various suitable logic algorithms. In addition, with the timing of the LCom signals emitted from the panels synchronized, the total light output of the luminaire can be configured to be maintained at a relatively constant level and/or data emitted from the luminaire may be divided amongst one or more panels, as will be described in more detail herein.

In the example embodiment shown in FIG. 13B, controller 150 of multiple panel luminaire 100 is configured to synchronize the timing of the LCom signals emitted from the panels. Further, with the timing of the LCom signals emitted from the panels synchronized, luminaire 100 is configured such that the A panels (1A, 2A, 3A, 4A) are each emitting a signal and the corresponding B panels (1B, 2B, 3B, 4B) are emitting a corresponding inverse signal of their counterpart A panel. For example, the LCom signal emitted from panel 1B is the inverse of the LCom signal emitted from panel 1A, the LCom signal emitted from panel 2B is the inverse of the LCom signal emitted from panel 2A, and so on. Therefore, when 1A is emitting a high signal, 1B is emitting a low signal, and vice versa. This is indicated in FIG. 13B where the A panel is either bright/white/on (which may represent a high signal) or dark/gray/off (which may represent a low signal), and the corresponding B panel is the other of bright or dark, as can be seen. For example, in the present state of multiple panel luminaire 100, panel 1A is dark and Panel 1B is bright. Knowing the inversion scheme for the specific configuration shown in FIG. 13B, it can also be seen that two panel sets have panels that are diagonal from each other (1A/1B, 2A/2B) and two panel sets have panels that adjacent to each other (3A/3B, 4A/4B). This configuration may be useful for creating a virtual fiducial that can provide orientation information, as will be described in more detail herein.

Figure 13C:
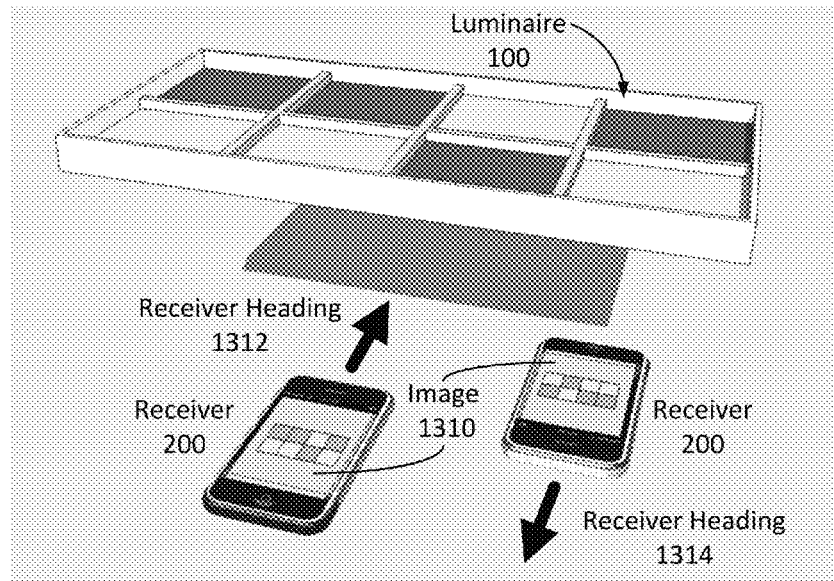
FIG. 13C illustrates a receiver viewing the multiple panel luminaire of FIG. 13B from two different orientations, in accordance with an embodiment of the present disclosure.

FIG. 13C illustrates receiver (computing device) 200 viewing multiple panel luminaire 100 of FIG. 13B from two different orientations, in accordance with an embodiment of the present disclosure. In this example embodiment, receiver 200 is a smart phone that includes a front-facing image capture device (camera) 252 configured to generate an image 1310, and receiver 200 is viewing luminaire 100 from below the luminaire. The arrows are provided to indicate receiver headings 1312, 1314 when observing the luminaire from below. Luminaire 100 includes the signal inversion pattern described with reference to the example embodiment in FIG. 13B (1A inverts 1B, 2A inverts 2B, etc.). As can be seen from the images 1310 displayed on the receiver in the two different orientations, when receiver 200 has heading 1312 in a first direction, the image of the luminaire is in a first orientation and when receiver 200 has heading 1314 in a second direction substantially opposite the first direction, the image of the luminaire is in a second orientation substantially opposite the first orientation. In this manner, multiple panel luminaire 100 creates a virtual fiducial that can provide orientation information to receiver 200. When receiver 200 identifies/observes the entirety of multiple panel luminaire 100, receiver 200 can tell which way the luminaire I oriented based on how the inverted panels are structured. In some cases, the meaning of the orientation information may be provided via the LCom signal(s) emitted from luminaire 100. For example, luminaire 100 may transmit that end of luminaire 100 where panels 4A and 4B are located faces north or that the end faces an identified point of origin or physical location, such that receiver 200 can use the orientation information to, for example, determine its position (e.g., using techniques for determining an LCom receiver position, as variously described herein).

Note that the inversion scheme provided in FIGS. 13B and 13C for creating a virtual fiducial for orientation purposes is provided for illustrative purposes and is not intended to limit the present disclosure. A multiple panel luminaire with as little as two panels may be used to create a virtual fiducial to provide orientation information. For example, two adjacent panels emitting distinct LCom signals may be spatially resolved (e.g., using the techniques for spatially resolving received LCom signals, as variously described herein), such that the location of each LCom signal within the FOV of a receiver can use the position of the LCom signals as an orientation cue. In another example, a long luminaire that is one panel wide but greater than two panels long (e.g., 100 panels long or any other suitable amount) may still provide position and/or orientation information, because the panels may be configured to emit LCom signals that can be used for receiver positioning. Also note that in some embodiments of a multiple panel LCom-enabled luminaire, all of the panels need not be capable of or configured to emit LCom signals. For example, only one of the panels may be configured to emit LCom signals, while the other panels are configured to output light that is not encoded with data. However, even in some such embodiments, the multiple panel luminaire may create a virtual fiducial for providing orientation information. Therefore, numerous variations and configurations will be apparent in light of this disclosure.

In some embodiments, light quality may be improved using a multiple panel luminaire. For example, in some such embodiments, the total light output may be maintained a relatively constant level, such that the light output variance is not perceptible by human vision. Maintaining total light output at a relatively constant level may include light output variance of less than 25%, 20%, 15%, 10%, 5%, or 2% lumens, or some other suitable tolerance as will be apparent in light of this disclosure. In some instances, this may be achieved by having the same number of panels in a high state as there are in a low state at any given time to keep the DC or ambient level relatively constant during pulsing and LCom emission. In some such instances, this can be done through the inversion of signals or through some balancing algorithm. Using the example luminaire of FIG. 13B, which has eight panels with each panel in either a high or a low state, in the case where there is no panel inversion, 256 different combinations would be possible (calculated by $2^8$). If an inversion rule was implemented such that the number of panels in a high state is about the same as the number of panels in a low state (no matter which panels), seventy different combinations would be possible (calculated using event probability—8!/4!/4!). If an inversion rule was implemented such that four panels are the inversion of four other panels (such as the case described above), sixteen different combinations would be possible (calculated by $2^4$). Depending on the desired data rate and reliability, the different inversion rules can be applied at different times. The table immediately below shows a summary of the different inversion rules:

| Inversion Rule | Combinations | Directionality |
| --- | --- | --- |
| Same amount of panels "high" as "low" | 70 | No |
| Four panels invert four others | 16 | Yes |

As can be seen in this table, the inversion rule of four panels inverting four others has fewer combinations and therefore a slower data rate, but the rule provides directionality to the smart phone in terms of providing directionality/creating a virtual fiducial for orientation information (as variously described herein). In some embodiments, a combination of the inversion rules may can be applied so that, for example, one part of the multiple panel luminaire (e.g., panels 1A and 1B) always invert each other, but the other panels do not follow such an inversion rule. In some such embodiments, directionality may still be provided and more combinations may be achieved.

In some embodiments, data transmission speeds and/or reliability can be improved using multiple panel luminaires. For example, assuming that a single panel luminaire has two states (e.g., high and low), one data bit can be transmitted at any given time. With further reference to Table 1, in the case of the inversion rule where four panels invert four others, eight (calculated by sixteen combinations divided by two states) times the amount of data compared to a single panel luminaire can be transmitted in a given amount of time (e.g., assuming both luminaires are pulsing with the same frequency). Therefore, data that would take one second to transmit using the eight panel luminaire applying the inversion rule that four panels invert four others rule would take eight seconds to transmit with a single panel luminaire assuming the same pulsing frequency. Numerous variations and configurations will be apparent in light of this disclosure. Recall that the eight panel luminaire described herein is provided for illustrative purposes and is not intended to limit the present disclosure. A multiple panel luminaire having any configuration and any number of panels or groups of light sources can be used to realize the benefits described herein.

Figure 13D:
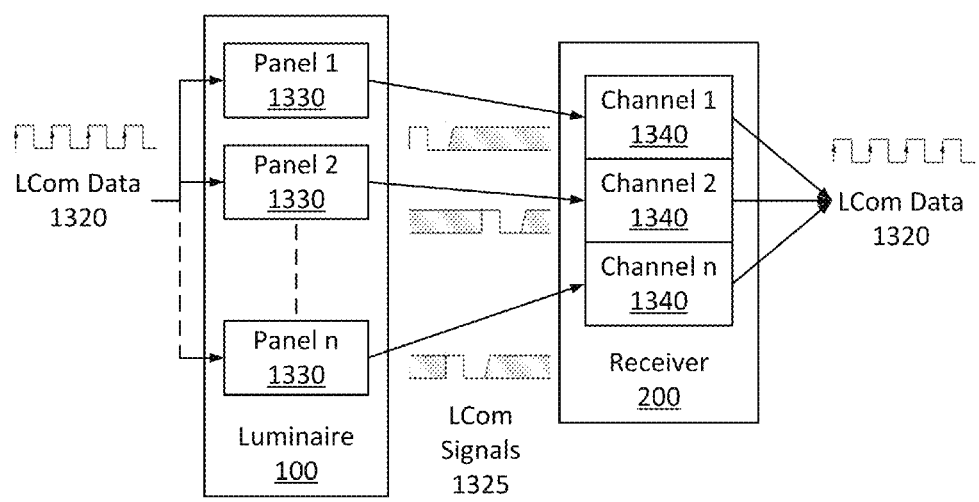
FIG. 13D illustrates an example multiple panel luminaire transmission, in accordance with an embodiment of the present disclosure.

FIG. 13D illustrates an example multiple panel luminaire transmission, in accordance with an embodiment of the present disclosure. As can be seen, the transmission starts with LCom data 1320. The data 1320 is divided amongst the panels 1330 of the multiple panel luminaire 100 to be emitted via LCom signals 1325. Luminaire 100 may have any number 'n' of panels 1330, where each panel includes at least one solid-state light source configured to output light. Data 1320 may be divided in any suitable manner, whether evenly or not, amongst one or more panels 1330 of luminaire 100. One or more modulators 174 may be configured to modulate the light output of the light sources of the panels to allow for the emission/transmission of LCom signals 1325 which may carry at least a portion of data 1320. Note, as previously described, in some embodiments, one or more panels of the multiple panel luminaire may not be configured to emit/transmit an LCom signal. Receiver 200 can receive LCom signals 1325 in one or more channels 1340 or sections, as variously described herein (e.g., using techniques for spatially resolving received LCom signals). Receiver 200 can then reconstruct the LCom data 1320 using the LCom signals 1325, as shown. This time and/or space division multiplexing can lead to a constant or improved light output while still maintaining a desired communication data rate and/or reliability.

Referring back to FIG. 13A, when a customer comes into the store looking for an item, the customer may be able to use an LCom receiver, such as their smart phone to start an indoor navigation app to guide them to the desired item. Once the app is activated, the camera on the smart phone may be configured to identify an LCom signal within its field of view from overhead luminaires 100. If luminaire 100 is identified and an LCom signal is detected, luminaire 100 can provide the exact location of the luminaire in space along with orientation information (e.g., what the pattern of inverted panels mean in terms of heading) to position the smart phone in space. In addition, data emitted from multiple panel luminaire 100 may be broadcasted at a faster rate than compared to, for example, a single panel luminaire, because the data can be divided amongst the LCom signals emitted from the multiple panels. The improvement in speed depends upon the particular configuration, but improvements may be at least 2×, 3×, 5×, 8×, or 10× the speed, or some other suitable amount as will be apparent in light of this disclosure.

An example alternative to a multiple panel LCom-enabled luminaire is a single panel LCom-enabled luminaire. Single panel luminaires may be able to provide orientation using an associated fiducial (such as a marking somewhere on the luminaire); however, using a multiple panel luminaire to create a virtual fiducial as variously described herein may be beneficial for providing orientation information, because it may be better detected by an LCom receiver. In addition, data rates and data integrity may be diminished through use of a single panel LCom-enabled luminaire compared to use of a multiple panel LCom-enabled luminaire. Another benefit of multiple panel luminaires as variously described herein may include being able to communicate to a slow speed receiving device, such as a smart phone front facing camera, without any perceptible visual artifacts. Such a benefit may be realized because when light output is modulated at less than 100 Hz, the quantity and quality of illumination can both get negatively affected, including issues with flicker and non-uniform illumination levels. Therefore, various benefits of multiple panel LCom-enabled luminaires include being able to provide orientation information as described herein, being able to maintain a constant light output and improve the quantity/quality of illumination provided, being able to transmit data at faster and more reliable rates, being able to establish a communication link with an LCom receiver in a faster and more reliable manner, and other benefits as will be apparent in light of the present disclosure.

Techniques for Spatially Resolving Received LCom Signals

Figure 14A:
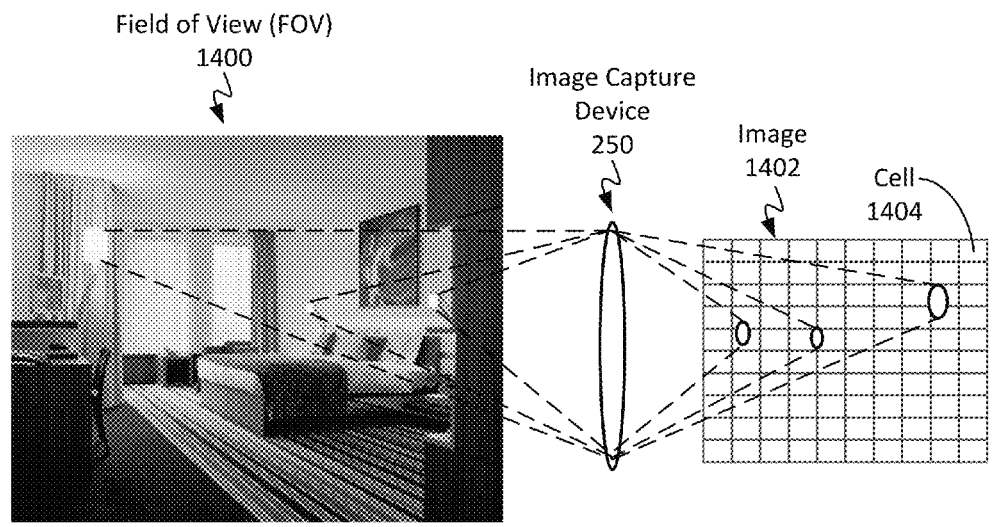
FIG. 14A illustrates an example field of view of an image capture device and a corresponding image, in accordance with an embodiment of the present disclosure.

FIG. 14A illustrates an example field of view 1400 of an image capture device 250 and a corresponding image 1402, in accordance with an embodiment of the present disclosure. In this example embodiment, the FOV 1400 and corresponding image 1402 are provided to describe techniques for spatially resolving received LCom signals. As can be seen, the FOV 1400 observed by image capture device 250 (referred to as a camera herein for ease of reference) includes three luminaires. For ease of description, it is assumed that each luminaire seen in FOV 1400 is transmitting an LCom signal.

Figure 14B:
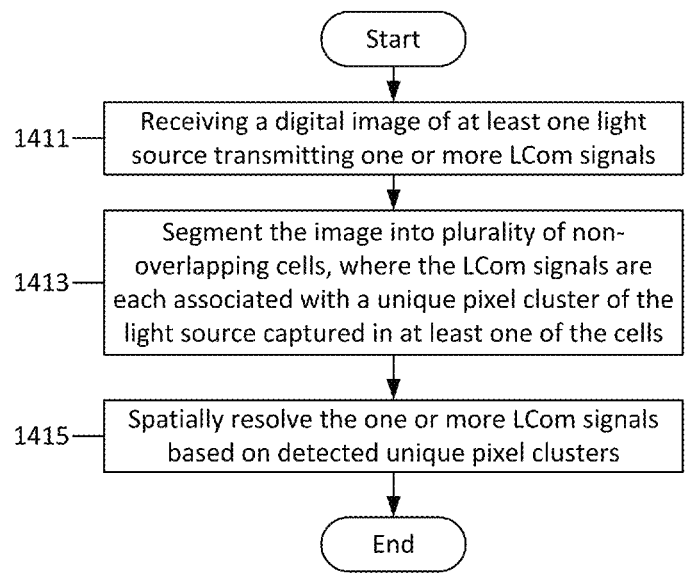
FIG. 14B illustrates an example method of spatially resolving received LCom signals, in accordance with an embodiment of the present disclosure.

FIG. 14B illustrates an example method of spatially resolving received LCom signals, in accordance with an embodiment of the present disclosure. For ease of description, the example FOV 1400 and image 1402 in FIG. 14A will be used to describe the methodology. The method of FIG. 14B includes receiving 1411, by a computing device 200, a digital image of at least one sold-state light source transmitting one or more LCom signals. The LCom signal(s) may be received/captured by a camera 250 of the device 200. The method also includes segmenting 1413 the image into a plurality of non-overlapping cells 1404, where the LCom signals are each associated with a unique pixel cluster of the light source captured in at least one of the cells. Segmenting 1413 can be performed using any suitable technique(s). The method continues by spatially resolving 1415 the one or more LCom signals based on detected unique pixel clusters. As can be seen in FIG. 14A, the luminaires in FOV 1400 are shown in the generated image 1402, where each luminaire is illustrated as captured using corresponding dotted lines. As can also be seen, image 1402 has been segmented into non-overlapping cells 1404 which are rectangular in shape. In some embodiments, each LCom signal can be associated with or interpreted as a unique pixel cluster comprising at least one of the cells to spatially resolve each LCom signal. Once each LCom signal is detected as or associated with a unique pixel cluster, that pixel cluster can be used to identify the location/position of the signal within the image 1402, along with other benefits that can be derived from spatially resolving each LCom signal, as will be discussed in more detail herein.

Figure 14C:
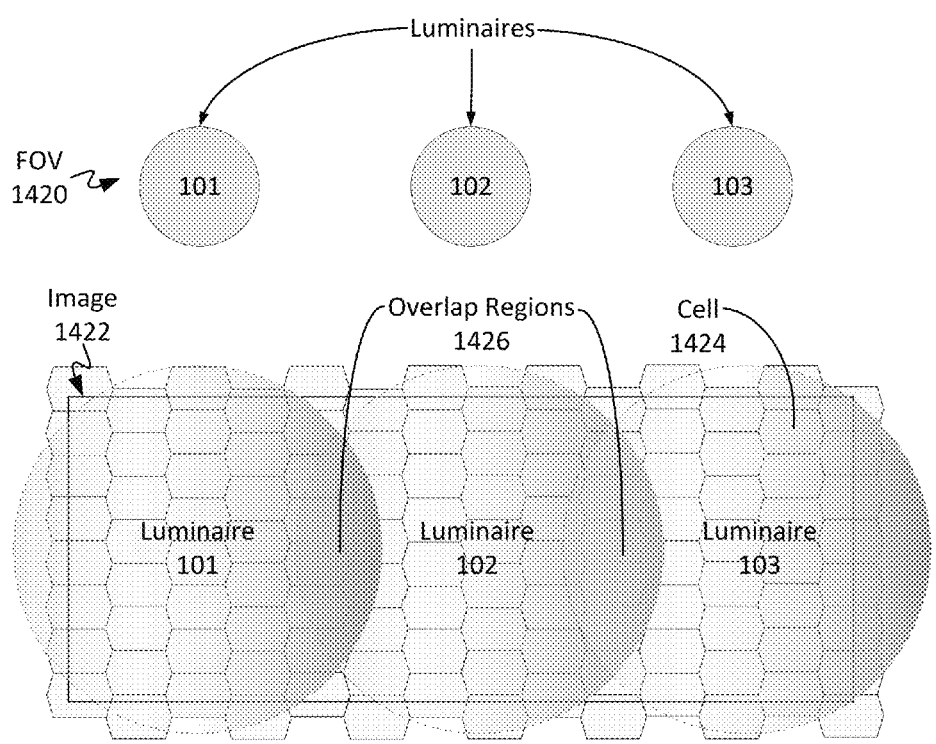
FIG. 14C illustrates an example field of view of an image capture device and a corresponding image, in accordance with another embodiment of the present disclosure.

FIG. 14C illustrates an example field of view 1420 of an image capture device 250 and a corresponding image 1422, in accordance with another embodiment of the present disclosure. The previous discuss with reference to FOV 1400 applies to FOV 1420 and the previous discussion with reference to image 1402 applies to image 1422. In this example embodiment, FOV 1420 includes three luminaires 101, 102, and 103. For ease of description, it is assumed that luminaires 101, 102, and 103 are each transmitting an LCom signal. Image 1422 is the corresponding image from below the luminaires. As can be seen, image 1422 was segmented into non-overlapping/unique hexagonal shaped cells 1424, where the received LCom signals are each associated with a unique pixel cluster comprising at least one of the cells 1424. As can also be seen, the observed LCom signals have overlap in the indicated overlap regions 1426, which will be discussed in more detail herein.

In some embodiments, received signal strength indicator (RSSI) information may be used to help determine the nearest communicating luminaire. For example, RSSI information for the LCom signals from luminaires 101, 102, and 103 may be used to assist in spatially resolving the LCom signals in image 1422, such as in overlapping regions 1426. RSSI information for an LCom signal may be based on the strength of the received LCom signal, the luminance of the light carrying the signal, or any other suitable factor as will be apparent in light of this disclosure. In some embodiments, the orientation of the LCom receiver may be used to assist in spatially resolving received LCom signals. For example, one or more gyroscopes within the receiver may be configured to determine orientation of the receiver (e.g., pitch, roll, and yaw) and the orientation information may be used to assist in spatially resolving the received LCom signals in image 1422, such as in overlapping regions 1426. In some embodiments, once received LCom signals are spatially resolved, cells associated with LCom signals can be filtered and focused on to, for example, improve the overall signal to noise ratio. Further, in some such embodiments, each LCom pixel cluster (comprising at least one cell for each LCom signal) can be filtered out and focused on to, for example, improve the signal to noise ratio for that LCom signal. In some embodiments, once received LCom signals are spatially resolved, cells or pixels not associated with any LCom signal may be filtered out to help improve signal to noise ratio for the LCom signals. Filtering out cells/pixels that do not carry any LCom signals can lead to, for example, improved communication speed and enhanced sampling frequency.

In FIGS. 14A and 14C, images 1402 and 1422 were segmented 1413 into rectangular and hexagonal shaped cells, respectively. However, segmenting 1413 may result in any suitable shaped cells, as will be apparent in light of this disclosure. In some embodiments, the cells may all be similar in size and shape. In some embodiments, the cells may all have a regular polygon shape. In some embodiments, the cells may be rectangular, square, triangular, hexagonal, circular, and/or any other suitable shape. Whereas using circular shaped cells can leave uncovered area, other shapes result in numerous unique and/or non-overlapping cells, such as rectangular, square, triangular, and hexagonal shaped cells. To achieve the best possible granularity with the least number of unique cells, the image can be segmented 1413 into similar sized hexagonal cells, such as is the case in FIG. 14C with cells 1422. The hexagonal cell shape 1422 can be used to maximize image coverage, because for a given distance between the center of a polygon and its farthest circumference points, the hexagon has the largest area. Therefore, by using hexagonal cell geometry, the fewest number of cells can cover an entire space (e.g., with cell sides being held constant).

Note that the techniques and principles described herein for spatially resolving received LCom signals may be used for multiple LCom signals received simultaneously from one or more LCom-enabled luminaires. Therefore, the techniques can be used with a single luminaire that is transmitting multiple LCom signals, such as a multiple panel luminaire as variously described herein, or with multiple luminaires that each transmit an LCom signal, or with a combination thereof. Also note that although the techniques are described herein in the context of spatially resolving more than one LCom signal, the principles can be applied to spatially resolve a single LCom signal within the FOV of an LCom receiver to, for example, increase receiver positioning accuracy. For example, in some embodiments, receiver positioning may be performed using the absolute position of at least two LCom luminaires (which may be communicated to the receiver via LCom signals) in conjunction with the image of the signals and information about the receiver tilt (e.g., yaw, pitch, roll) and orientation (e.g., obtained from an on-board magnetometer/geomagnetic sensor). In some such embodiments, the positioning technique may include spatially resolving the location of the at least two luminaires as variously described herein (e.g., by determining the origin of the LCom signals of the two luminaires detected by the receiver) and using the direction/orientation of the receiver to determine the receiver position/location. Further, in some such embodiments, the geometry of the luminaires involved need not be known.

An example alternative to the techniques for spatially resolving multiple LCom signals described herein includes using a photodiode instead of a camera or image capture device to establish a line of sight communication with an LCom signal source. Such an example alternative does not offer the same quality of spatial resolution, including not being able to differentiate between multiple LCom signals. Another example alternative includes using a directional photo sensor. However, such an example alternative may include having to direct the directional photo sensor toward the LCom signal source(s). Therefore, the techniques variously described herein can be used to establish a link with multiple LCom signals within the FOV of a receiver without conflict and/or determine the location of those LCom signals. Additional benefits of the techniques as variously described can include increasing LCom receiver positioning accuracy/precision, receiving multiple LCom signal sources even in areas of signal overlap, improving signal to noise ratio (SNR), enhancing sampling frequency, improving communication speed, being able to filter out pixels within the FOV that do not include an LCom signal, and other benefits as will be apparent in light of the present disclosure.

Numerous variations on the methodologies of FIGS. 5A, 5C, 6C, 7B, 8A, 8B, 9A 10B, 11B, and 14B will be apparent in light of this disclosure. As will be appreciated, and in accordance with some embodiments, each of the functional boxes shown in these figures can be implemented, for example, as a module or sub-module that, when executed by one or more processors 140 or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field-programmable gate array, purpose-built silicon, etc.).

Numerous embodiments will be apparent in light of this disclosure. One example embodiment provides a receiver including: a camera having a field of view (FOV) and for generating an image within the FOV, the image having a zoom factor; and a processor configured to: identify a luminaire within the image; calculate a distance from the camera to the luminaire using geometry of the luminaire, at least one of size and position of the luminaire in the image, and the zoom factor of the image; and calculate the position of the camera relative to the luminaire using the distance and orientation of the camera relative to the luminaire. In some cases, identifying the luminaire within the image comprises detecting, by the camera, a light-based communication (LCom) signal received from the luminaire. In some such cases, the geometry of the luminaire is determined using the LCom signal received from the luminaire. In some cases, the orientation of the camera relative to the luminaire is determined using a fiducial associated with the luminaire, the fiducial being detectable within the image generated by the camera. In some such cases, the fiducial is a special marking of the luminaire, a non-symmetric design aspect of the luminaire, or a unique geometry of the luminaire. In some cases, the receiver includes a gyroscopic sensor configured to determine the roll, pitch, and yaw of the camera relative to the ground for determining the orientation of the camera relative to the luminaire. In some cases, the receiver includes a geomagnetic sensor configured to determine the absolute heading of the camera for determining the orientation of the camera relative to the luminaire. In some cases, the processor is further configured to calculate the absolute position of the receiver using the absolute position of the luminaire and the position of the camera relative to the luminaire. In some such cases, the absolute position of the luminaire is determined using a light-based communication (LCom) signal received from the luminaire, the LCom signal detectable by the camera. In some cases, a system includes the receiver as variously described and the luminaire, wherein the luminaire is configured to transmit a light-based communication (LCom) signal.

Another example embodiment provides a light-based communication (LCom) method including: generating, by a camera having a field of view (FOV), an image within the FOV, wherein the image has a zoom factor; identifying a luminaire within the image; calculating a distance from the camera to the luminaire using geometry of the luminaire, at least one of size and position of the luminaire in the image, and the zoom factor of the image; and calculating the position of the camera relative to the luminaire using the distance and orientation of the camera relative to the luminaire. In some cases, identifying the luminaire within the image comprises detecting, by the camera, a light-based communication (LCom) signal received from the luminaire. In some such cases, the geometry of the luminaire is determined using the LCom signal received from the luminaire. In some cases, the orientation of the camera relative to the luminaire is determined using a fiducial associated with the luminaire, the fiducial being detectable within the image generated by the camera. In some such cases, the orientation of the camera relative to the luminaire can be further determined using the roll, pitch, and yaw of the camera and/or the luminaire, while in some such cases, the orientation of the camera relative to the luminaire can be further determined using the absolute heading of the camera. In some cases, the method includes calculating the absolute position of the receiver using the absolute position of the luminaire and the position of the camera relative to the luminaire. In some such cases, the absolute position of the luminaire is determined using an LCom signal received from the luminaire, the LCom signal detectable by the camera.

Another example embodiment provides a non-transitory computer program product comprising a plurality of instructions non-transiently encoded thereon that, when executed by one or more processors, cause a process to be carried out. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories. The process is configured to (or otherwise includes): receive, from a camera having a field of view (FOV), an image within the FOV, wherein the image has a zoom factor; identify a luminaire within the image; calculate a distance from the camera to the luminaire using geometry of the luminaire, at least one of size and position of the luminaire in the image, and the zoom factor of the image; and calculate the position of the camera relative to the luminaire using the distance and orientation of the camera relative to the luminaire. In some cases, the process is configured to calculate the absolute position of the camera using the absolute position of the luminaire and the position of the camera relative to the luminaire.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A receiver comprising:
 a camera having a field of view (FOV) and for generating an image within the FOV, the image having a zoom factor; and
 a processor configured to:
  identify a luminaire within the image;
  calculate a distance from the camera to the luminaire using geometry of the luminaire, at least one of size and position of the luminaire in the image, and the zoom factor of the image;
  determine an orientation of the camera relative to the luminaire using a fiducial associated with the luminaire, the fiducial being detectable within the image generated by the camera and providing an orientation cue, wherein the fiducial is a non-symmetric design aspect of the luminaire; and
  calculate the position of the camera relative to the luminaire using the distance and orientation of the camera relative to the luminaire.

2. The receiver of claim 1, wherein identifying the luminaire within the image comprises detecting, by the camera, a light-based communication (LCom) signal received from the luminaire.

3. The receiver of claim 2, wherein the geometry of the luminaire is determined using the LCom signal received from the luminaire.

4. The receiver of claim 1, further comprising a gyroscopic sensor configured to determine the roll, pitch, and yaw of the camera relative to the ground for at least partially determining the orientation of the camera relative to the luminaire.

5. The receiver of claim 1, further comprising a geomagnetic sensor configured to determine the absolute heading of the camera for at least partially determining the orientation of the camera relative to the luminaire.

6. The receiver of claim 1, wherein the processor is further configured to calculate the absolute position of the receiver using the absolute position of the luminaire and the position of the camera relative to the luminaire.

7. The receiver of claim 6, wherein the absolute position of the luminaire is determined using a light-based communication (LCom) signal received from the luminaire, the LCom signal detectable by the camera.

8. A system comprising the receiver of claim 1 and further comprising the luminaire, wherein the luminaire is configured to transmit a light-based communication (LCom) signal.

9. A light-based communication (LCom) method comprising:
   generating, by a camera having a field of view (FOV), an image within the FOV, wherein the image has a zoom factor;
   identifying a luminaire within the image;
   calculating a distance from the camera to the luminaire using geometry of the luminaire, at least one of size and position of the luminaire in the image, and the zoom factor of the image;
   determining an orientation of the camera relative to the luminaire using a fiducial associated with the luminaire, the fiducial being detectable within the image generated by the camera and providing an orientation cue, wherein the fiducial is a non-symmetric design aspect of the luminaire; and
   calculating the position of the camera relative to the luminaire using the distance and orientation of the camera relative to the luminaire.

10. The method of claim 9, wherein identifying the luminaire within the image comprises detecting, by the camera, a light-based communication (LCom) signal received from the luminaire.

11. The method of claim 10, wherein the geometry of the luminaire is determined using the LCom signal received from the luminaire.

12. The method of claim 9, wherein the orientation of the camera relative to the luminaire can be further determined using the roll, pitch, and yaw of the camera and/or the luminaire.

13. The method of claim 9, wherein the orientation of the camera relative to the luminaire can be further determined using the absolute heading of the camera.

14. The method of claim 9, further comprising calculating the absolute position of the camera using the absolute position of the luminaire and the position of the camera relative to the luminaire.

15. The method of claim 14, wherein the absolute position of the luminaire is determined using an LCom signal received from the luminaire, the LCom signal detectable by the camera.

16. A non-transitory computer program product encoded with instructions that, when executed by one or more processors, causes a process to be carried out, the process comprising:
   receive, from a camera having a field of view (FOV), an image within the FOV, wherein the image has a zoom factor;
   identify a luminaire within the image;
   calculate a distance from the camera to the luminaire using geometry of the luminaire, at least one of size and position of the luminaire in the image, and the zoom factor of the image;
   determine an orientation of the camera relative to the luminaire using a fiducial associated with the luminaire, the fiducial being detectable within the image generated by the camera and providing an orientation cue, wherein the fiducial is a non-symmetric design aspect of the luminaire; and
   calculate the position of the camera relative to the luminaire using the distance and orientation of the camera relative to the luminaire.

17. The computer program product of claim 16, the process further comprising:
   calculate the absolute position of the camera using the absolute position of the luminaire and the position of the camera relative to the luminaire.

* * * * *